US012549569B2

(12) United States Patent
Lal et al.

(10) Patent No.: US 12,549,569 B2
(45) Date of Patent: Feb. 10, 2026

(54) AUTOMATED SANDBOX GENERATOR FOR A CYBER-ATTACK EXERCISE ON A MIMIC NETWORK IN A CLOUD ENVIRONMENT

(71) Applicant: Darktrace Holdings Limited, Cambridge (GB)

(72) Inventors: Jake Lal, Cambridge (GB); Frank Jasik, Cambridge (GB); Simon Fellows, Peterborough (GB); James Rees Wingar, Cambridge (GB); Alexander Fox Thompson, Cambridge (GB); Billy McDermot, Cambridge (GB); John Boyer, Cambridge (GB)

(73) Assignee: Darktrace Holdings Limited, Cambridge (GB)

( * ) Notice: Subject to any disclaimer, the term of this patent is extended or adjusted under 35 U.S.C. 154(b) by 334 days.

(21) Appl. No.: 18/368,979

(22) Filed: Sep. 15, 2023

(65) Prior Publication Data
US 2024/0098100 A1    Mar. 21, 2024

Related U.S. Application Data

(60) Provisional application No. 63/436,425, filed on Dec. 30, 2022, provisional application No. 63/407,435, filed on Sep. 16, 2022.

(51) Int. Cl.
*H04L 9/40* (2022.01)
(52) U.S. Cl.
CPC ...... *H04L 63/1416* (2013.01); *H04L 63/1433* (2013.01); *H04L 63/1441* (2013.01); *H04L 63/1491* (2013.01)
(58) Field of Classification Search
CPC ............. H04L 63/1416; H04L 63/1433; H04L 63/1441; H04L 63/1491
See application file for complete search history.

(56) References Cited

U.S. PATENT DOCUMENTS 10,268,821 B2   4/2019   Stockdale
10,419,466 B2   9/2019   Ferguson
(Continued)

FOREIGN PATENT DOCUMENTS

CN    112354178 A  *  2/2021  ............. A63F 13/52

OTHER PUBLICATIONS

International Searching Authority, Notification of Transmittal of the International Search Report and the Written Opinion of the International Searching Authority, or the Declaration, Jan. 26, 2024, 15 pages.

*Primary Examiner* — Richard G Keehn
(74) *Attorney, Agent, or Firm* — Rutan and Tucker, LLP

(57) ABSTRACT

An automated sandbox generator for a cyber-attack exercise on a mimic network in a cloud environment can include various components. The cloud deployment component deploys the mimic network in a sandbox environment in the cloud environment. The mimic network can be a clone of components from a network that exists in an organization's environment and/or, predefined example components. The attack engine deploys a cyber threat to use an exploit for the wargaming cyber-attack exercise in the mimic network. The user interface displays, in real time, results of the wargaming cyber-attack exercise being conducted in the sandbox environment, to create a behavioral profile of how the cyber threat using the exploit would actually perform in that particular organization's environment as well as have human users interact with the cyber threat deployed by the attack engine during the cyber-attack on the mimic network, as it happens in real time, during the wargaming cyber-attack exercise.

20 Claims, 10 Drawing Sheets

(56) References Cited

U.S. PATENT DOCUMENTS

| | | | |
|---|---|---|---|
| 10,701,093 B2 | 6/2020 | Dean | |
| 10,769,045 B1* | 9/2020 | Sharifi Mehr | H04L 63/1433 |
| 11,336,690 B1* | 5/2022 | Urias | H04L 63/1491 |
| 11,637,866 B2* | 4/2023 | Crabtree | H04L 63/1441 |
| | | | 726/22 |
| 12,184,693 B1* | 12/2024 | Eliav | H04L 63/1491 |
| 12,330,062 B2* | 6/2025 | Liu | A63F 13/577 |
| 2009/0254572 A1* | 10/2009 | Redlich | G06Q 10/10 |
| 2016/0027260 A1* | 1/2016 | Pierce | G07F 17/3276 |
| | | | 463/7 |
| 2018/0343278 A1 | 11/2018 | Vallone et al. | |
| 2020/0244673 A1 | 7/2020 | Stockdale | |
| 2021/0273958 A1 | 9/2021 | McLean | |
| 2021/0409283 A1* | 12/2021 | Smith | H04L 41/0883 |
| 2022/0129295 A1* | 4/2022 | Zhang | H04L 67/142 |
| 2022/0168646 A1* | 6/2022 | Liu | A63F 13/45 |
| 2022/0263855 A1 | 8/2022 | Engelberg et al. | |
| 2022/0345386 A1* | 10/2022 | Madanapalli | H04L 47/2441 |
| 2022/0417000 A1* | 12/2022 | Andreadakis | H04L 9/0662 |
| 2023/0007439 A1* | 1/2023 | Williams | H04L 63/083 |
| 2025/0254197 A1* | 8/2025 | Rosomakho | H04L 63/1416 |

\* cited by examiner

FIG. 4 Network

AUTOMATED SANDBOX GENERATOR FOR A CYBER-ATTACK EXERCISE ON A MIMIC NETWORK IN A CLOUD ENVIRONMENT

RELATED APPLICATION

This application claims priority under 35 USC 119 to U.S. provisional patent application No. 63/407,435, titled "A CYBER THREAT DEFENSE SYSTEM" filed Sep. 16, 2022, and U.S. provisional patent application No. 63/436,425, titled "A CYBER SECURITY SYSTEM" filed Dec. 30, 2022, which the disclosures of such are each incorporated herein by reference in their entirety.

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

FIELD

Cyber security and in an embodiment use of cyber security incident response.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cyber threat against the enterprise network, one or more computing devices connected to the enterprise network, stored or in-flight data accessible over the enterprise network, and/or other enterprise-based resources. This cyber threat may involve malware (malicious software) introduced into a computing device or into the network. The cyber threat may originate from an external endpoint or an internal entity (e.g., a negligent or rogue authorized user). The cyber threats may represent malicious or criminal activity, ranging from theft of credential to even a nation-state attack, where the source initiating or causing the cyber security threat is commonly referred to as a "malicious" source. Conventional cybersecurity products are commonly used to detect and prioritize cybersecurity threats (hereinafter, "cyber threats") against the enterprise, and to determine preventive and/or remedial actions for the enterprise in response to those cyber threats.

SUMMARY

Methods, systems, and apparatus are disclosed for incident response with a cyber security system. An example Artificial Intelligence-based cyber security system can include multiple Artificial Intelligence-based engines that cooperate to identify a cyber threat, mitigate that cyber threat and other cyber threats, restore from that cyber threat and other cyber threats, and factor in simulations of cyber threats. In an embodiment, an automated sandbox generator for a cyber-attack exercise on a mimic network in a cloud environment can include a cloud deployment component, an attack engine, a monitoring component, and a user interface component configured to cooperate with each other. The cloud deployment component can provide an automated solution to deploy the mimic network, which consists of a portion of 1) an information technology network, 2) a cloud network, 3) an email network, or 4) a combination of all three, in a sandbox environment in the cloud environment, where the mimic network is i) a clone of some subset of components from 1) the information technology network, 2) the cloud network, 3) the email network, or 4) the combination of all three, that exists in an organization's environment, ii) a subset of predefined example components found in network architectures, or iii) some combination of both. The cloud deployment can utilize a sandbox creator to create a sandbox environment in the cloud environment. The attack engine can deploy a cyber threat to use an exploit that can be tested and interacted with during a wargaming cyber-attack exercise in the mimic network deployed by the cloud deployment component. The monitoring component can communicate with a series of sensors deployed in the mimic network in the sandbox environment in the cloud environment. A user interface component can communicate with the monitoring component to display results of testing in the wargaming cyber-attack exercise be displayed in the user interface component, where the monitoring component is configured to utilize an existing set of artificial intelligence models trained on a normal pattern of life of entities in the organization's environment and its associated machine learning. The user interface can display, in real time, parameters, messages, model breaches, and other results of the wargaming cyber-attack exercise being conducted in the sandbox environment, to create a behavioral profile of how the cyber threat using the exploit would actually perform in that particular organization's environment These and other features of the design provided herein can be better understood with reference to the drawings, description, and claims, all of which form the disclosure of this patent application.

DRAWINGS

The drawings refer to some embodiments of the design provided herein in which.

Figure 4:
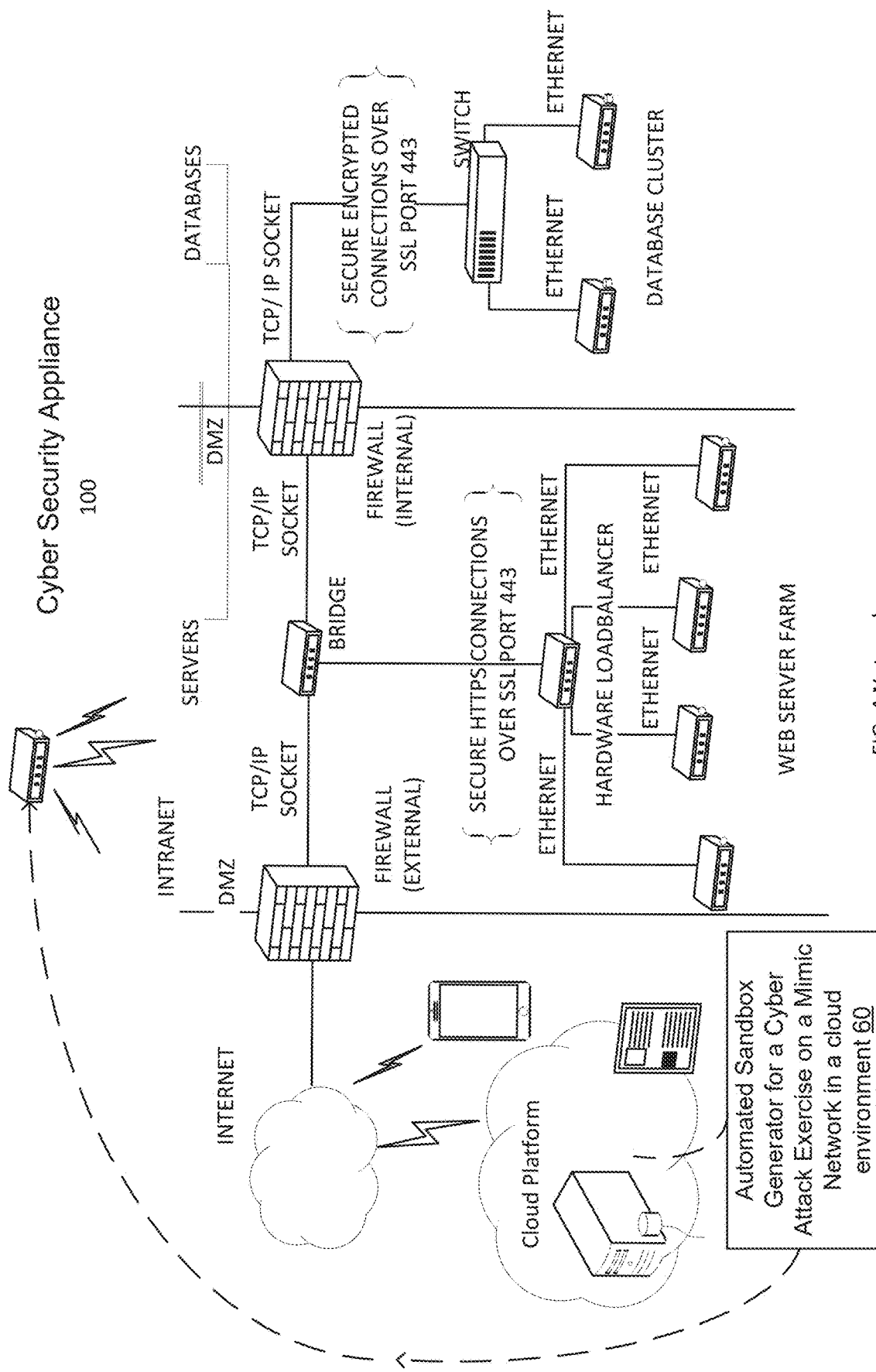

FIG. 4 illustrates a diagram of an embodiment of a user interface component configured to communicate with the monitoring component in the automated sandbox generator for a cyber-attack exercise on a mimic network to display results of testing in the wargaming cyber-attack exercise be displayed in the user interface component, where the monitoring component is configured to utilize an existing set of artificial intelligence models trained on a normal pattern of life of entities in the organization's environment and its associated machine learning from the cyber security appliance.

Figure 5:
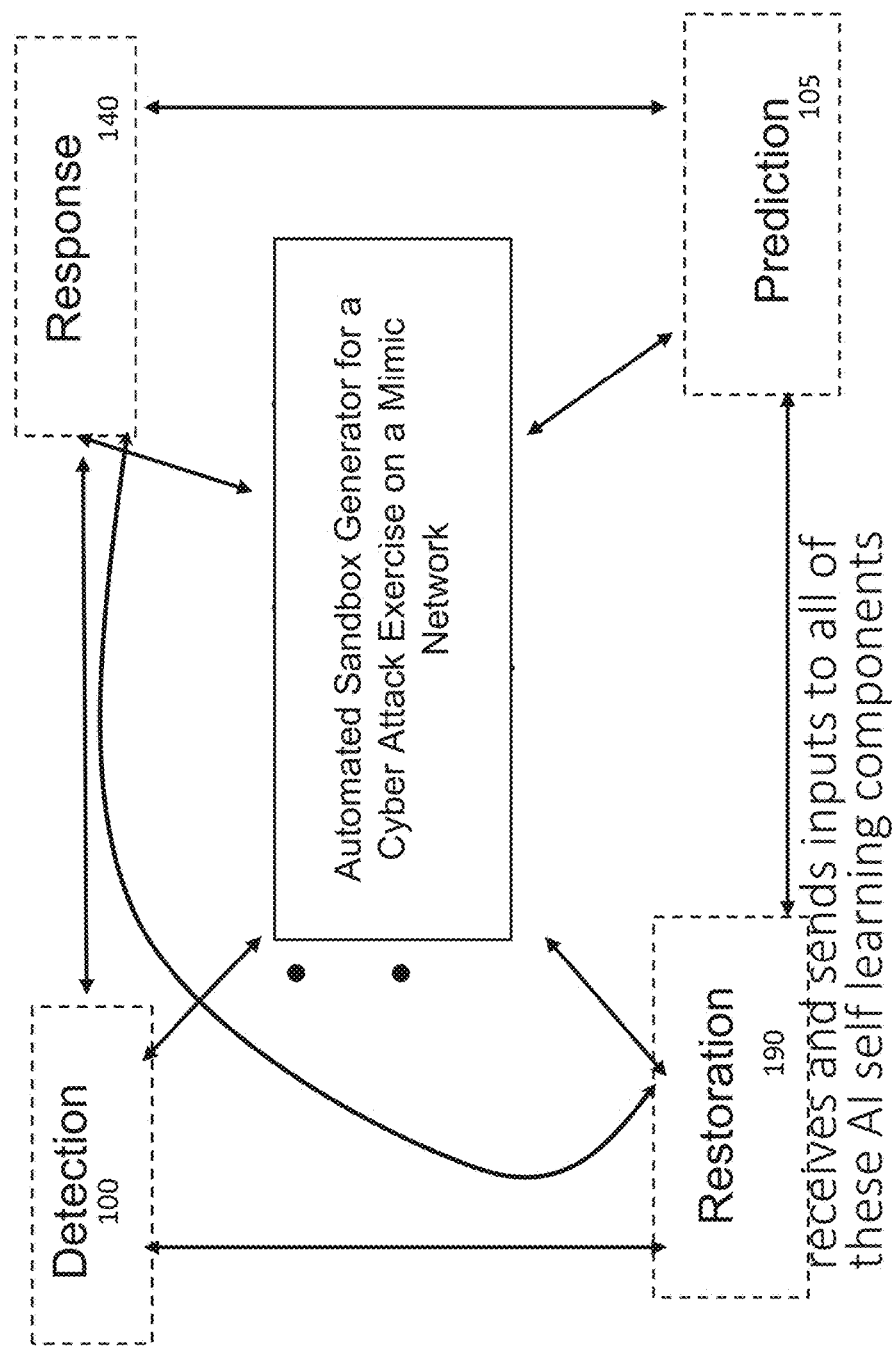

FIG. 5 illustrates a diagram of an embodiment of an example an Artificial Intelligence augmented and adaptive interactive response loop between the example four Artificial Intelligence-based engines and the automated sandbox generator for a cyber-attack exercise on a mimic network in a cloud environment.

Figure 6:
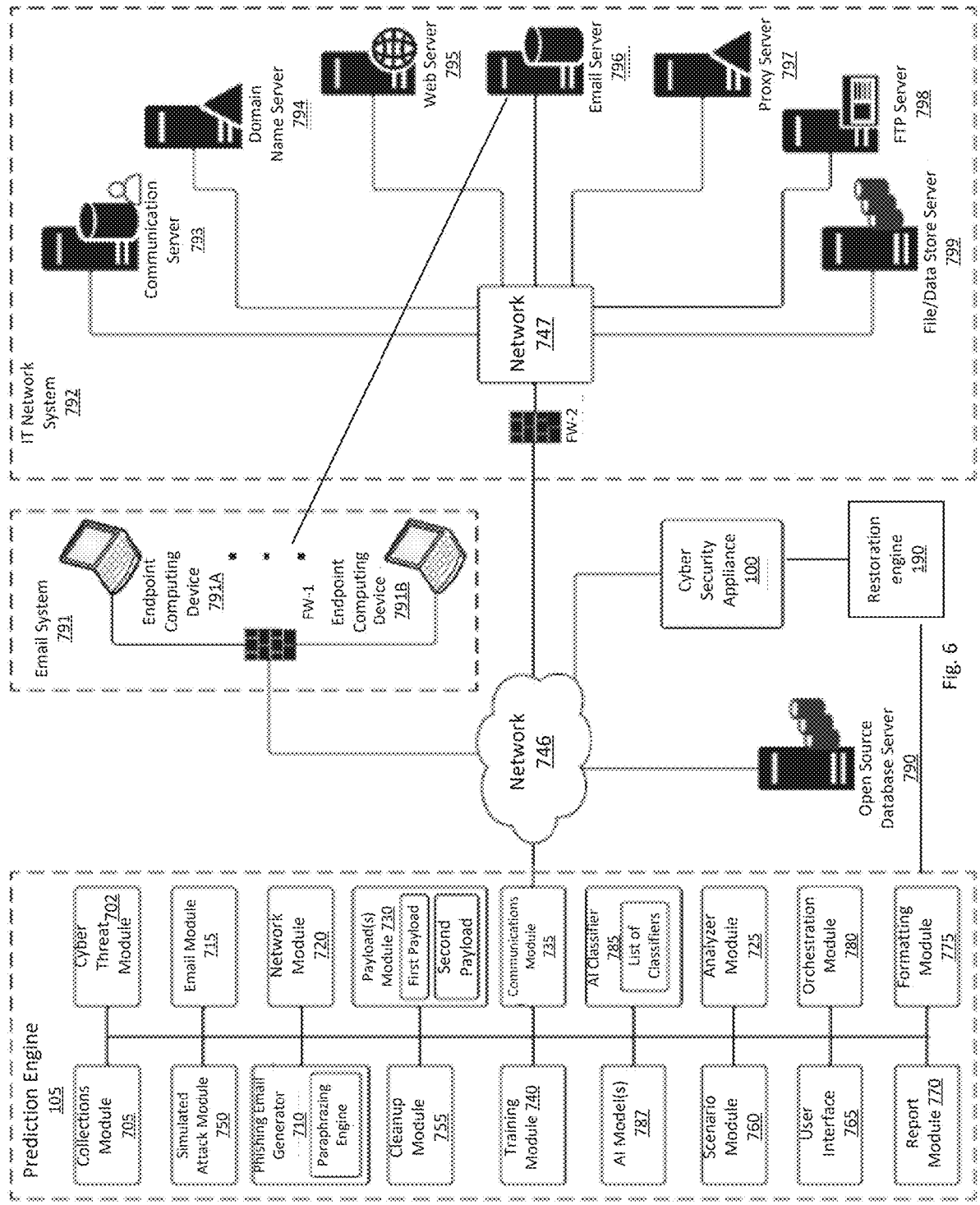

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualize machines of the network, user accounts in the network, email accounts in the network, etc. as well as ii) connections and pathways through the network) to create a simulated version of the system to be tested.

Figure 7:
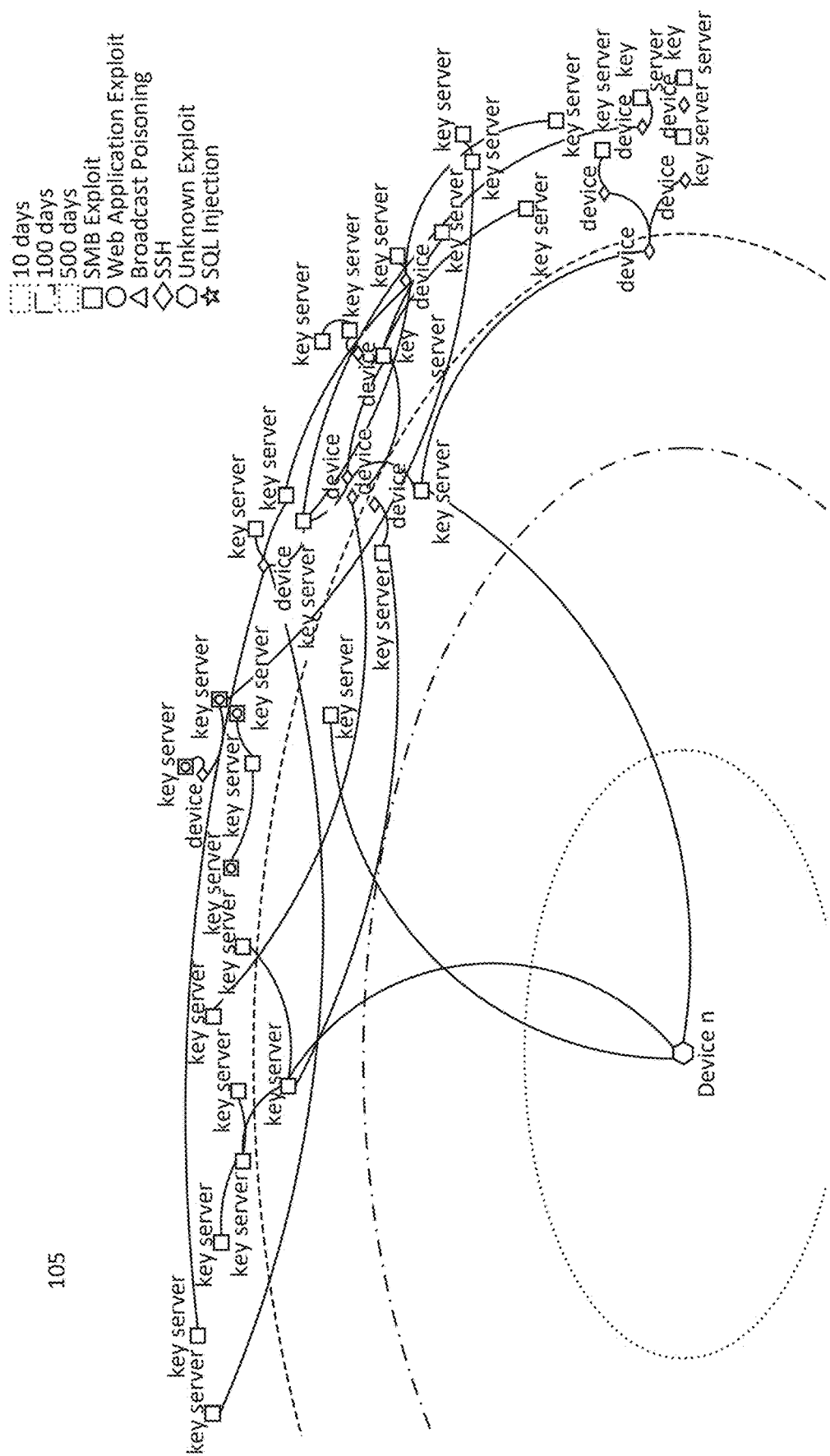

FIG. 7 illustrates a diagram of an embodiment of a cyber threat prediction engine and its Artificial Intelligence-based simulations constructing a graph of nodes in an example network and simulating how the cyberattack might likely progress in the future tailored with an innate understanding of a normal behavior of the nodes in the system being protected and a current operational state of each node in the graph of the protected system during simulations of cyberattacks.

Figure 8:
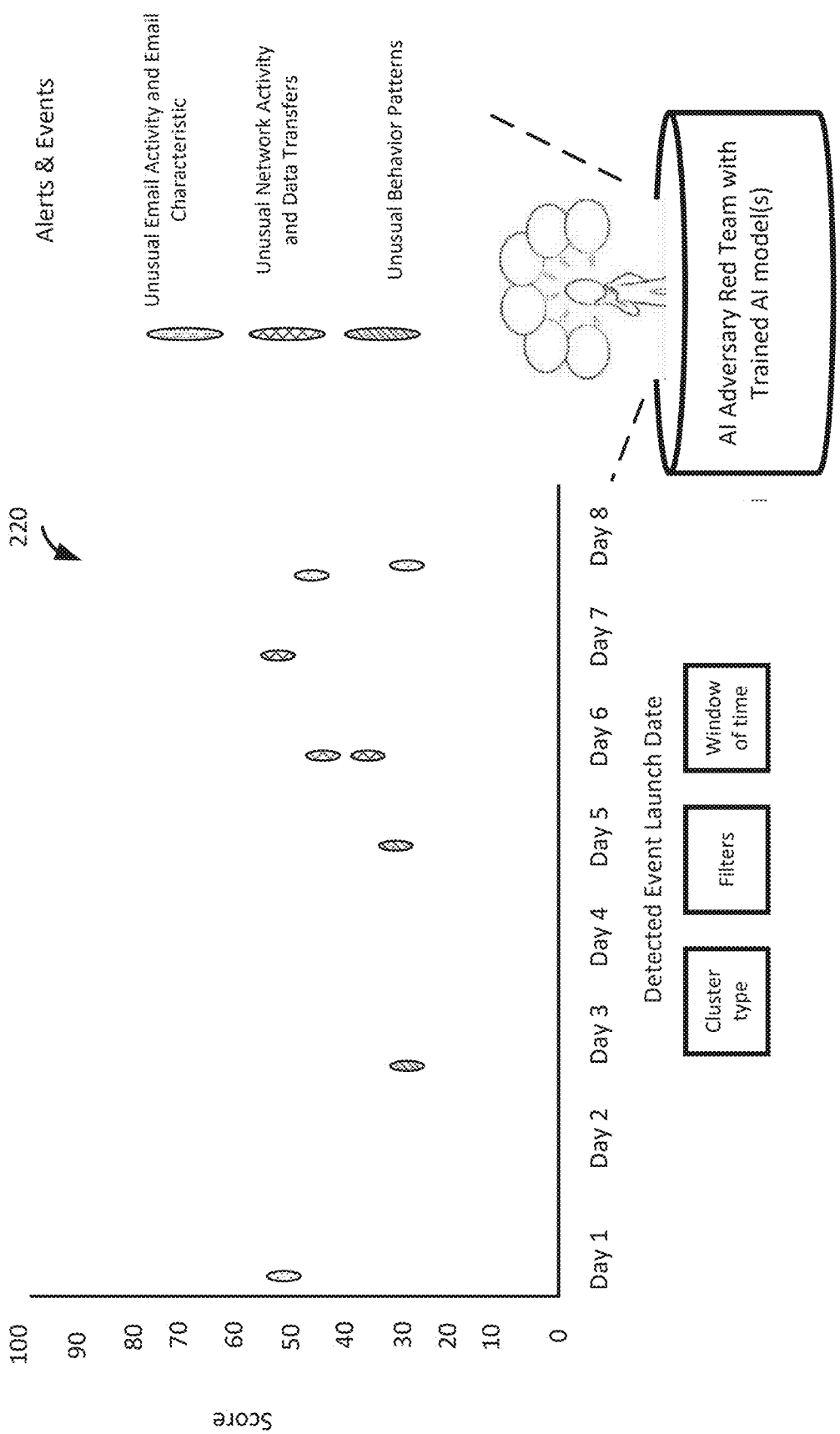

FIG. 8 illustrates a graph of an embodiment of an example chain of unusual behavior for, in this example, the email activities and IT network activities deviating from a normal pattern of life in connection with the rest of the system/network under analysis.

Figure 9:
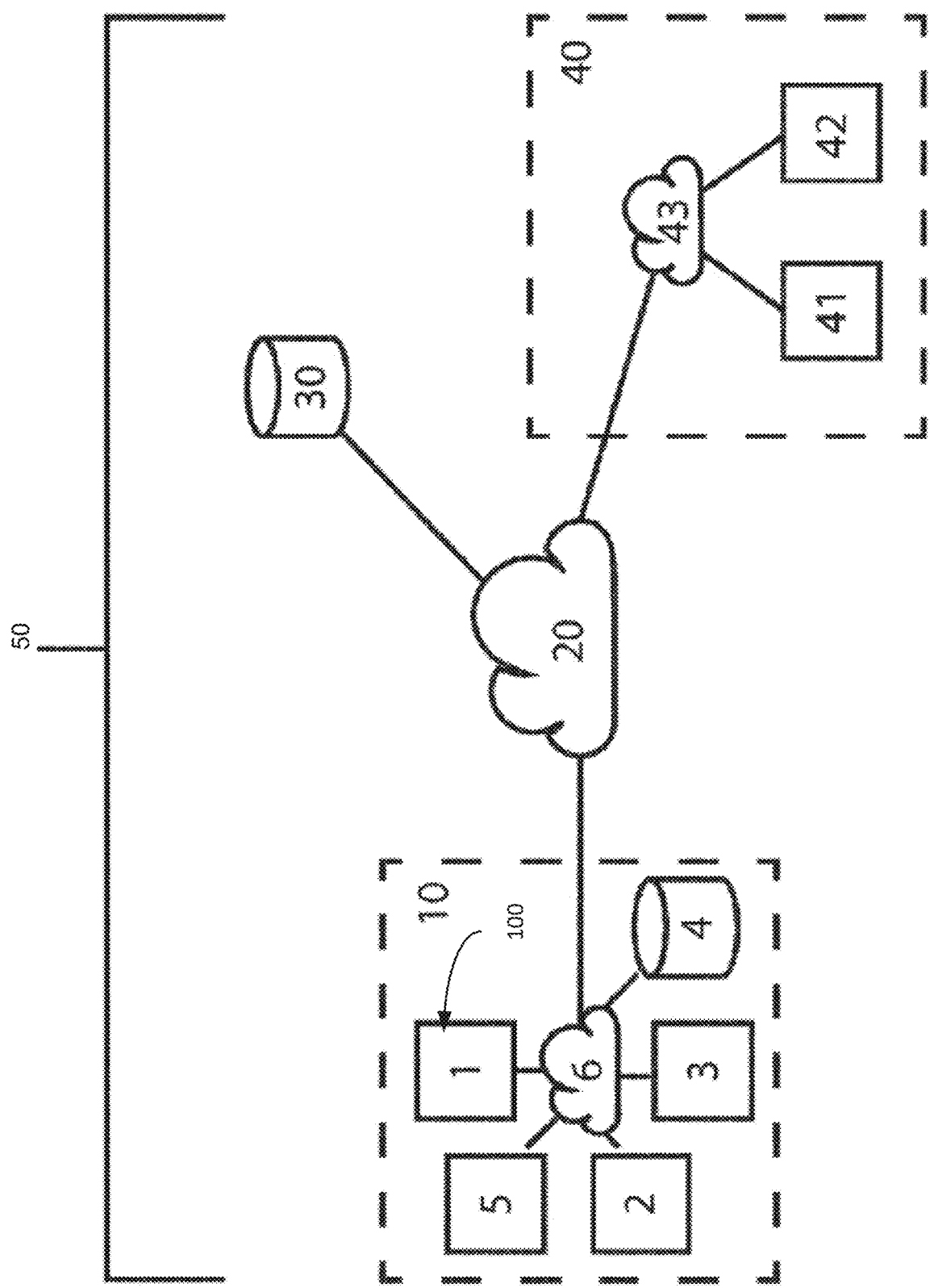

FIG. 9 illustrates a block diagram of an embodiment of the AI-based cyber security appliance with the cyber security restoration engine and other Artificial Intelligence-based engines plugging in as an appliance platform to protect a system.

Figure 10:
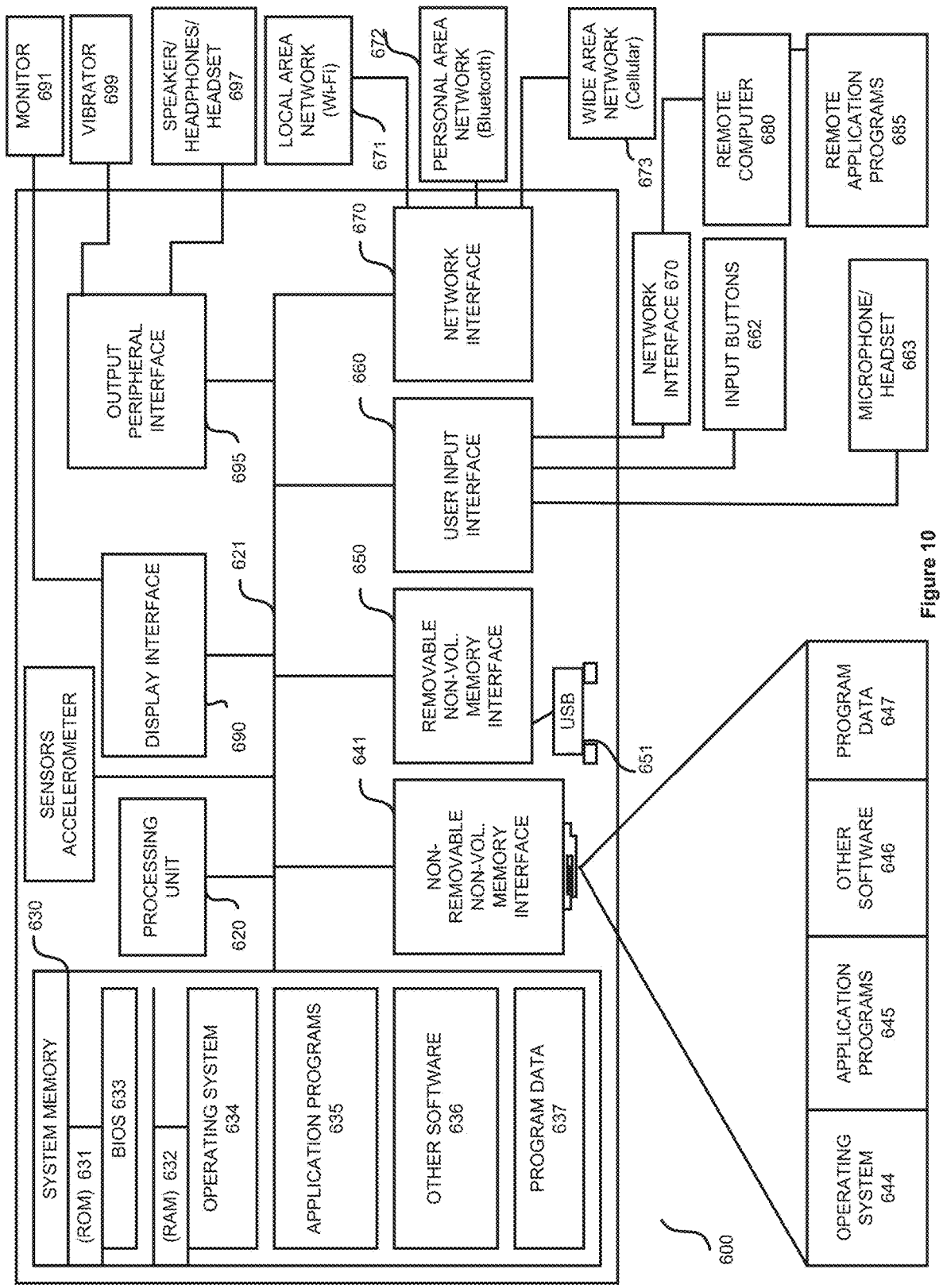

FIG. 10 illustrates a block diagram of an embodiment of one or more computing devices that can be a part of the Artificial Intelligence-based cyber security system including the multiple Artificial Intelligence-based engines discussed herein.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary. Also, the features implemented in one embodiment may be implemented in another embodiment where logically possible. The specific details can be varied from and still be contemplated to be within the spirit and scope of the present design. The term coupled is defined as meaning connected either directly to the component or indirectly to the component through another component.

Figure 1:
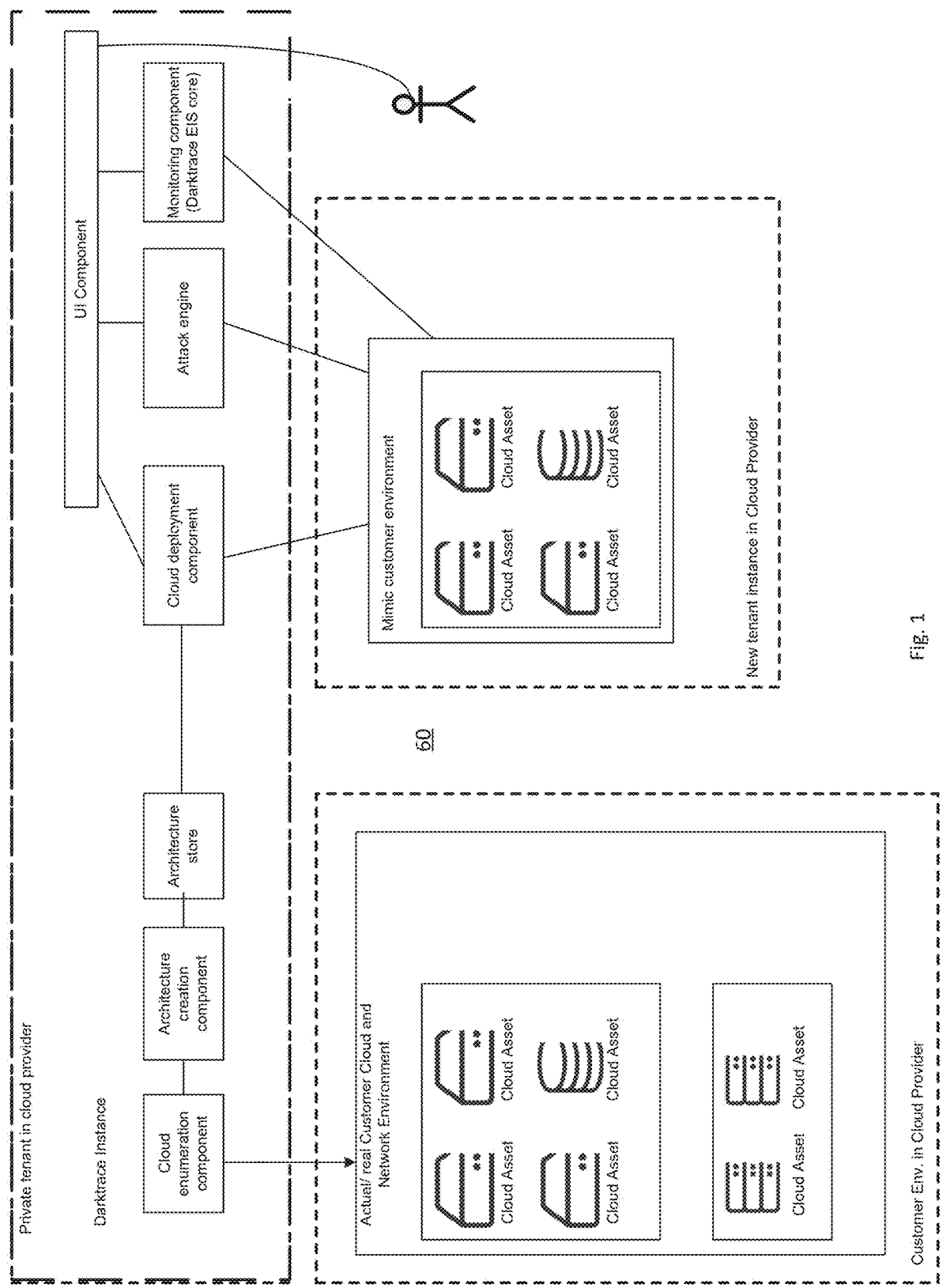
FIG. 1 illustrates a block diagram of an embodiment of the automated sandbox generator for a cyber-attack exercise on a mimic network in a cloud environment.

FIG. 1 illustrates a block diagram of an embodiment of the automated sandbox generator for a cyber-attack exercise on a mimic network in a cloud environment. The automated sandbox generator for a cyber-attack exercise on a mimic network in a cloud environment 60 can have various components such as the cloud enumeration component, the architecture creation component, the architecture store, the cloud deployment component, the attack engine, the monitoring component, the recording component, the user interface component, etc. The automated sandbox generator for a cyber-attack exercise on a mimic network in a cloud environment 60 can be used to create mimic networks for wargaming exercises against cyber threats exploiting vulnerabilities in the cloned network under analysis.

The automated sandbox generator for a cyber-attack exercise on a mimic network in a cloud environment 60 has multiple components.

The cloud deployment component can provide an automated solution to deploy the mimic network, which consists of a portion of 1) an information technology network, 2) a cloud network, 3) an email network, or 4) a combination of all three, in a sandbox environment in the cloud environment. The mimic network can be i) a literal clone of some subset of components from 1) the information technology network, 2) the cloud network, 3) the email network, or 4) a combination of all three that exists in an organization's environment/is implemented by the organization (e.g., cloned in the data files, software installed, version of that device, etc. and then implemented on/cloned onto a spun up virtual machine), ii) a subset of predefined example components found in common network architectures, or iii) some combination of both. The cloud deployment component is further configured to utilize a sandbox creator to create a sandbox environment in the cloud environment. (e.g., in Azure Cloud is configured to allow a user to create an Azure Sandbox environment with the following steps: Sign into the Azure Portal, click on Create a Resource on the dashboard; Select the "Sandbox" option, and then click Create to create a temporary tenant environment in the cloud provider.) The attack engine can deploy a cyber threat, from a library of selectable cyber threats, to use an exploit or a series of exploits that can be tested and interacted with, including capable of remote control over actions taken by the cyber threat, during a wargaming cyber-attack exercise in the mimic network deployed by the cloud deployment component. The attack engine can utilize automatic attack construction for the cyber threat, which can incorporate i) an importation of an output of attack path modeling from a prevent cyber-attack simulator, ii) an awareness of Attack Surface Monitoring, and iii) any combination of both, to try and establish when a customer is vulnerable to a certain exploit used by the cyber threat in the cyber-attack on the mimic network.

The monitoring component can communicate with a series of sensors deployed in the mimic network in the sandbox environment in the cloud environment. (Also, see FIGS. 4 and 5) A user interface component can communicate with the monitoring component to display results of testing in the wargaming cyber-attack exercise be displayed in the user interface component mimicking at least an appearance and functionality of the user interface of a cyber security appliance protecting the 1) information technology network, 2) cloud network, and/or 3) email network, that exists in the organization's environment. The monitoring component can utilize an existing set of artificial intelligence models trained on a normal pattern of life of entities in the organization's environment and its associated machine learning. The monitoring component can use different mechanisms to utilize an existing set of artificial intelligence models trained on a normal pattern of life of entities in the organization's environment and its associated machine learning such as i) making a snapshot of a state of an existing cyber security appliance that is a mirror copy of the cyber security appliance protecting the organization's environment, or ii) establishing a secure communications channel with an actual cyber security appliance that is operating in real time to protect the organization's environment, but is made aware, such as by markers or other indicators that information being sent via the secure communications channel is coming from the wargaming cyber-attack exercise in the sandbox environment.

The user interface component can display, in real time, parameters, messages, model breaches, and other results of the wargaming cyber-attack exercise being conducted in the sandbox environment, to create a behavioral profile of how a certain cyber threat using one or more exploits would actually perform in that particular organization's environment. i) The cyber security appliance protecting the organization's environment, ii) a separate recording component, or iii) a combination of both, can record the parameters, messages, model breaches, and other results of the wargaming cyber-attack exercise for later review as a wargaming cyber-attack exercise session that can be reviewed in the future. The user interface component is further configured to output specific aspects of the results of the wargaming cyber-attack exercise in a form of a printable report. The user interface component cooperating with the attack engine can present controls and menu options to allow individual human cyber security professionals/users to interact with the cyber threat deployed by the attack engine during the cyber-attack on the mimic network in the cloud environment, as it happens in real time, during the wargaming cyber-attack exercise. The presented controls and menu options allow individual human cyber security professionals i) to attempt to mitigate the cyber-attack by the cyber threat and the exploits it is using from progressing in real time (e.g. Blue team removing or lowering privileges, etc.), and ii) conversely, to interact with the cyber threat during the cyber-attack on the mimic network in such a way to make progress on goals of the cyber-attack by augmenting and/or overriding scripted actions of the cyber threat during the cyber-attack on the mimic network.

The automated sandbox generator for a cyber-attack exercise on a mimic network in a cloud environment provides the ability to test out what portions and functions of a customer's network may be migrated to the cloud and analyze what may be exploited in the cloud without having to actual have migrated to the cloud. In addition, the automated sandbox generator for a cyber-attack exercise on a mimic network in a cloud environment provides the ability to change network policies in the sandbox environment first and see the effect on the cyber threat prior to a cloud migration with the changed network policies before they are actually implemented in the actual/real customer cloud and network environment; and thus, create and then test their network policies in advance. In addition, the automated sandbox generator for a cyber-attack exercise on a mimic network in a cloud environment provides the creation of client's environments or other example environments in the sandbox environment to allow training and development of human cyber security teams, for both general security training of how cyber-attacks happen and progress as well as training on the UI component of the security devices, including the training to extend to client's environments in the cloud and network to better the human cyber security team's incidence response posture.

The automated sandbox generator for a cyber-attack exercise on a mimic network in a cloud environment creates a cloned network environment in the cloud. The architecture creation component cooperating with the cloud deployment component allows the cloned network environment to be composed/populated with i) a standardized environment of components, such as servers, load balancers, storage arrays, backup devices, domain controllers, firewalls, etc., (taken from cloud or enterprise computing), ii) derived from a known client environment (cloud or enterprise) identified by the cybersecurity system and ii) a combination of both.

Next, the cloud enumeration component analyzes an existing real network and cloud environment and tries to determine the details of the components making up that network and cloud environment. The cloud enumeration component sends metadata about all discovered assets to the architecture creation component. The cloud enumeration component receives from the UI component the choice of the customer network to be enumerated.

Next, the architecture creation component receives the metadata about all the discovered assets of a real customer network and cloud environment including all the cloud assets and network assets from the cloud enumeration component. The architecture creation component constructs an architecture by connecting known assets in the networking cloud environment of the customer and sends that architecture to the architecture store.

Next, the architecture store stores the details of the assets and network structure and then can supply those architectural details and or subsets of the architectural details of components to the cloud deployment component when the cloud deployment component is going to spin up the cloned customer environment in the cloud in the protected sandbox environment and utilize the subset of components chosen to be observed and attacked by the human cybersecurity professionals participating in this war gaming exercise.

The architecture store can store for this customer's environment a graph database of nodes that exist within that architecture including the cloud. The architecture creation component would go and say, what each component is within that architecture and then also identify the architecture's purpose such as an email architecture. The architecture store can store relatedness information e.g., there is a subset that are all connected to one another. Based on the human cyber security professional's review of this information on the UI component and then selection of what subset of components to test, the cloud deployment component will be scripted to pull that information in, and then deploy similar entities from premade generic components in the architecture store or go off and snapshot those network and cloud component entities from the customer's environment, and deploy them literally onto the virtual machines in the sandbox full of the customer's data and software being run.

Next, the cloud deployment component is configured to dynamically generate an instance of a sandbox environment as a new tenant instance in the cloud provider and control all internet communications into and/or out of the cloned customer environment. The new tenant instance in the cloud provider is a short-lived clone sandbox that gets destroyed after the war gaming exercise and completely separate from the private tenant instance in the cloud hosting all of the components in the automated sandbox generator for a cyber-attack exercise on a mimic network in a cloud environment 60. Thus, no chance for the instance of the cyber threat deployed by the attack engine actually harming either the components in the private tenant instance in the cloud or the components of the actual customer environment. The cloud deployment component also is configured to populate the cloned customer environment in the instance of a sandbox environment. The cloud deployment component can spin up clone assets in the sandbox environment in the cloud provider that mimics cloud and network assets chosen by the human cyber security team via any of the following two mechanisms. 1) The cloud deployment component can spin up clone assets in the sandbox environment in the cloud provider by using pre-existing library of virtual machines that emulate/simulate various cloud assets and network assets such as databases servers et cetera. 2) The cloud deployment component can also spin up clone assets in the sandbox environment in the cloud provider by taking snapshots of customers real components in their network and cloud environment. In this way when a snapshot is taken of the database or of a server, then all of the mirror image of all of the software and information on that database or on that server are imported into the virtual machine spun up in the cloud environment to replicate and/or imitate the customer cloned environment in the sandbox. The cloud deployment component can get the architectural details of the organization's real cloud and network components making up their environment from the architecture store and pulls those details in when spinning up and populating the virtual machines with that information. The cloud deployment component also receives from the UI component the choices from the so human cyber security team of what subset of the customer's network will be spun up and cloned in the customer environment in the sandbox to be tested and wargamed upon.

The human cyber security professional will typically choose a subset of components within the architectural details of the entire actual/real Customer Cloud and Network Environment cloud because of the expenses and time it takes to spin up every component within their cloud and network environment. The attack engine communicates with the prevent cyber threat attack simulator and the cyber security appliance to find the components with the highest risk and vulnerability scores and/or most likely attack paths in this particular network to allow the users to intelligently choose a subset of components typically including at least the cloud assets making up this particular network.

Next, the attack engine receives from the UI component the choices from the human cyber security team of what type of attack cyber-attack is going to be launched as well as other choices of design criteria of what choice is to be carried out. The attack engine is also configured to deploy (launch and release) the attack by the cyber threat on the created clone network environment. In an example, the attack engine can supply command and control information into a launched advanced, persistent threat, and how it actually migrates itself through the created clone network environment. The attack engine is further configured to record events and data in a log of attack data of how the cyber-attack is progressing on the mimic network, what components in the mimic network are being affected by the cyber threat, the effects of any counter measures used by a human cyber security team and any automated responses by an autonomous response module in the cyber security appliance on the cyber threat that was deployed, and then the attack engine sends out the log with all that information to the user interface component so that the human cybersecurity team can observe how the cyber-attack on the mimic network is playing out. The attack engine gives the ability to define this kind of framework via scripts and run diverse attacks on a very realistic environment (e.g., the clone is a copy of a real customer's environment in the sandbox in the cloud. The cyber threat such as an APT, Malware, Ransomware, Distributed denial of service (DDoS) attack, etc. to gain credentials or gain access for important information.

The attack engine receives from the UI component the choices from the human cyber security team to control the cyber-attack launched and then deploy whatever they want, and then see the cyber-attack launched as it progresses on exactly whatever they deployed. Each different cyber threat type has a corresponding set of scripts written from the coding of an instance of that cyber threat as well as actual reports of how that cyber threat attacked networks in the past. The attack engine has a list of scripts of different strategies and techniques to get from completely outside the network to getting inside the network. The attack engine has a list of scripts of different strategies and techniques to once inside the network proceed to a key component such as compromising and then taking over e.g., owning a domain controller, obtaining a key set of files secured on a component such as a server, etc. The attack engine will then start this attack and track its progress of that, and relay that back to the user interface component, so that the human cyber security professional can see and control how far the attack has gone and what the cyber-attack is actually doing at the time. The attack engine has an input to allow human input from a human cyber security professional acting as a red team to augment and/or override the scripted techniques and actions that would be taken by a given cyber threat. The human cyber security professional can click on and/or give voice input or text input into the UI component on the selection of the particular cyber threat launched as well as the actions the particular cyber threat may take. The human cyber security professional can click controls, for example, who initiates the attack, who decides what the attack should entail, and who actually performs the attack.

The attack engine has intelligence running with algorithms and software that run operations of the attack engine in general as well as algorithms and software that automatically per a script control the cyber threat progressing through the mimic network as well as allows human input to augment and/or override actions scripted to control the cyber threat and its attack. Thus, the attack engine may be a fully automated attack that follows scripts for the cyber-attack, a fully manual attack where the human cyber security professional controls each decision for the cyber-attack, or a combination of both.

The attack engine automatically constructs a cyber threat attack and uses this clone framework. The attack engine can reference a prevent cyber-attack simulator if the client's network has one or a generic prevent cyber-attack simulator used for this automated sandbox generator for a cyber-attack exercise on a mimic network in a cloud environment 60 for details and insight on what the attack should entail, this fully automated, which is where we could use the output of the attack path modeling to decide on an approach like the best method to compromise the environment. Thus, the attack engine automatically constructs the cyber threat attack on this clone framework of the customer's environment and factors in attack paths (that are more susceptible to this form of cyber threat attack deployed) from attack path modeling specific to this particular network.

The Monitoring Component

The monitoring component can make a mirror image and then spin up clones of the cyber security appliance and its machine learning models of the pattern of life of the entities (e.g., users and devices) in the network, a restoration engine, and a prevent cyber threat attack simulator that is used in the client's network, or establishes a two-way communication with the actual cyber security appliance and its models of pattern of life of the entities and devices in the network, the restoration engine, and the prevent cyber threat attack simulator that is used in the client's network themselves where the communications have a marker inserted or other indications so that the cyber security devices themselves and their machine learning understand the information from wargame engine are synthetic and will be acted upon but never factored into the machine learning utilized by cyber security devices or stored or maintained in the history of events of this customer's network. Thus, the cyber security appliance will detect the actions occurring in the mimic network and indicate when these actions in the cloned network deviate from the normal behavior of entities in the real customer network.

The monitoring component monitors the mimic of customer's network with sensors and then sends the monitoring information back out to the UI component so that the UI component can show how the attack is playing out in real time. In parallel, a recording component is recording all the information being obtained from the sensors going into the monitoring component as the attack is occurring in real time and the actions of the human cyber security professionals as well as the automated actions of the cybersecurity protection systems and how that is affecting the ongoing attack in the cloned customer environment in the sandbox environment. The recording component also records attack data how the attack is progressing, what components are being affected, the effects currently on the cyber threat that was introduced, etc. The attack engine records a log of attack data how the attack is progressing, what components are being affected, the effects currently on the cyber threat that was introduced which that information, and then the attack engine sends out all of this information to the UI component so that the human cybersecurity team can observe how the attack is playing out and the recording component can record all of that information in parallel so that later a review of what happened and fast forwarding and reversing of through these scenario of the attack can occur for future analysis.

The monitoring component works with sensors and other feedback components in the cloned customer environment to provide information on what the parameters and traffic and other details of what is occurring in the cloned customer environment as well as to show the attack from the cyber threat is progressing. The monitoring component works with the cloud deployment component to deploy Operating System sensors, client sensors, virtual machine sensors, etc. on the virtual machines spun up to provide information on what the parameters and traffic and other details of what is occurring in the cloned customer environment. The attack engine is in communication with the launched cyber threat and keeps a log of a progress report each time the cyber threat does something on a compromised component, the report will also indicate whether the cyber threat's action was successful or not. The human security professional can look at those logs and see what the cyber threat via the attack engine is actually doing and how it is responding to the actions taken by the humans and the rest of the cyber security devices. The monitoring component works with the UI component to display this information to human cyber security professionals as well as over to the recording component. The monitoring component also keeps track of the autonomous response engine's actions and human's actions of shutting down equipment, changing permissions, etc. actions used to counter the cyber threat during the wargaming exercise in the cloned customer environment. The UI component displays the typical information coming from the cyber security appliance such as model breaches occurring, trends, AI cyber analyst write ups, autonomous response actions taken and/or recommendations from the autonomous response engine to mitigate the cyber threat, restoration actions/suggestions from the restoration engine, etc. The monitoring component can use the V-sensors and OS-sensors, as well as the existing cloud module in the cyber security appliance that has AI classifiers and algorithms to evaluate data (e.g., traffic) pulled in from V-sensors and OS-sensors in a cloud network such as AWS, and then this third entity (the discrete cloud network risk score generator that can pull in network logs, etc. The system pulls in an actual enumeration of everything that exists in the cloud through this API, and then uses that information to tie back together those alerts from the SaaS module, or those alerts from the V-sensors and OS-sensors.

Inputs from the cyber security appliance and autonomous response module/engine, the restoration engine, and the prevent cyber threat attack simulator to detect and respond to the cyber-attack will be fed interactively into and back out of the components populating the cloned network. (Also, see FIGS. 4 and 5) The attack engine through its scripts and capability to receive human cyber security professional inputs through the UI component to augment and/or override scripted actions contextualizes a feedback loop between the autonomous response engine's actions and human's actions of shutting down equipment, changing permissions, etc. actions used to counter the cyber threat during the wargaming exercise, the attack engine pulling that data back in and representing the end user how those actions have affected the cyber threat and its actions in the wargaming exercise. The detector of the cyber security appliance will be monitoring of the unusual behavior and shows how it manifests in the user interface component, and how the pattern of life is modeled.

More Details on the Operation

The cloud enumeration component, the architecture creation component, and the architecture store cooperate to form an intelligent cloud architecture type detector. The cloud enumeration component enumerates all assets (e.g., virtual machines, databases) present in the customer cloud environment using an API-based method. All firewall and user policies are also parsed. The purpose of the product is cloud security misconfigurations, understanding enumerations of the kind of risk level in the cloud, and what assets the organization's networking environment has in the cloud. The unified system has one user interface component that features audit information from the cloud network, and sets an enumeration and kind of compliance, misconfigurations on those assets in the cloud.

The cloud enumeration component cooperating with the architecture creation component then constructs a graph where each asset appears as a node. Pseudo "VPC" nodes are seeded into the graph. The cloud architecture can consist of different asset types—x number of virtual machines, x number of compute engines, X number of Rds databases, etc.

The cloud architecture-based approach examines a particular cloud architecture, such as the Customer Cloud and Network Environment, composed of pieces of infrastructure.

The cloud enumeration component cooperating with the architecture creation component conceptualizes the infrastructure in the Customer Cloud and Network Environment to connect assets together to derive the purpose of architectures. So, an example infrastructure might include a series of databases and different types of servers that might include a load balancer and other different asset types. Note, for example, that each of the series of databases can be checked for risk misconfigurations. So individual nodes set in that architecture themselves carry risk. The architecture creation component creates a graph of each discreet cloud network (based on connectivity and group purpose of that discreet cloud network) and a risk analysis associated with that discreet cloud network.

The cloud enumeration component enumerates all assets (e.g., virtual machines, databases) present in the customer cloud environment using an API-based method. Thus, the cloud enumeration component enumerates, every asset that exists in, for example, the customer's AWS environment and every kind of user and every firewall policy, and all of this information is used to construct a graph database where every asset is a node.

The architecture creation component then constructs a graph where each asset appears as a node. Pseudo "Virtual Private Cloud (VPC)" nodes are seeded into the graph. Edges are drawn between nodes based upon features such as a parent/child relationship (EC2 is in VPC 1 which is in region A), owns/contains relationships (database A owns volume B), and traffic relationships (network policy permits traffic between two entities).

Thus, the architecture creation component connects those nodes together by a series of edges. The first kind of edge is a child parent, child relationship. So, a subnet contains Ec. 2, so that Ec2 is connected to a subnet with a parent child relationship. Another kind of edge relationship that you might have is—has or owns. So, an Ec. 2 might own a certificate. An SSL certificate which will be a separate type of asset. You also have traffic type edges. So, one instance can talk to another one because of a firewall policy.

The user interface component visualizes/presents the connected whole cloud infrastructure being analyzed. As discussed above, the architecture creation component automatically generates/creates its own diagrams, which the user/human cyber security professional can then interact with, and the user can click on individual cloud assets to find out the risk. In the architecture creation component, for serverless assets, edges are also drawn between user entities and the assets they can impact—by role permissions or be read/write permissions.

In the cloud enumeration component, a search algorithm starts from each VPC node on the resulting graph. The search algorithm can start at a top node, and then see what the search algorithm can reach with the search, and everything the search algorithm can reach is considered part of this cloud architecture under analysis and presented on the UI component. Thus, the search algorithm attempts to traverse from each VPC node to as many assets as possible—some edge types and some node types are marked as untraversable. The set of connected assets that results from this analysis are considered an "architecture"—an interconnected series of assets in the cloud that represent a discrete infrastructure or project. In an organization's overall cloud network, the cloud enumeration component and the architecture creation component cooperate to produce these sets of discrete cloud architectures, which are stored in the architecture store.

The architecture creation component computes risk for each different/discrete cloud architecture. First, the architecture creation component applies a misconfiguration algorithm to evaluate all assets for known misconfigurations and each asset is given a score. Then, the score of each asset in an architecture is used to re-weight all connected assets. For example, the system will check an asset for misconfigurations and determine for this device, through this virtual machine is exposed to the Internet; and that is a misconfiguration on it. The architecture creation component will check the misconfigurations on all of the assets in an architecture, and then, if one is particularly risky, then the system can use that to raise the misconfiguration level of every connected instance. Secondly, each node is evaluated for importance. For example, a list of types of devices in the cloud architecture can be maintained in a database to indicate the relative importance of a device, which might be more important than some other type of device that is deemed a bit less useful or smaller in function. This importance may be done by type, or by computing some form of graph centrality within the context of the architecture. Finally, nodes are assessed for proximity/exposure to the wider internet.

All that is combined together to create a risk score. The misconfiguration score is summed for the architecture and weighted with the importance and proximity/exposure metrics. Thus, that is how the architecture creation component generates a risk for that architecture. And that's how the architecture store can prioritize, for example, all types of alerts in the cyber security appliance based upon the riskiness of the architecture that they're associated with.

Note, the cloud enumeration component and the architecture creation component cooperate to enumerate and graph what architecture is present in a customer's Cloud and Network Environment without a need for the customer's seeding input. The system does not need the client to identify individual components in a cloud network (and for example say my servers are these 3 Ec2's, this database, this DNS server, etc.) The cloud enumeration component can automatically compute that these things are committed towards one another. They have some kind of relationship between each other and therefore they are probably interconnected. The system presents the discrete cloud network on the user interface component. The user interface component also provides the client with the ability to add or remove nodes if they want to, after the architecture has been generated.

The attack engine is configured to ingest the existing risk scoring for these assets in the Customer Cloud and Network environment if the existing cyber security appliance protecting that Customer Cloud and Network environment has seen them and how they relate to the discrete cloud network. The architecture creation component also evaluates misconfigurations on top of the ingestion of other risk scoring. The cyber security appliance already provides factors for risk scoring from the organization's known system. Again, the cloud enumeration component computes and generates that infrastructure in the discreet cloud network from just a basic list of resources. This cloud enumeration component enumerates and maps out what components are in this particular cloud network and the architecture creation component determines scores for this particular cloud network, which the attack engine can ingest any other existing risk scoring for these assets put into this discrete cloud network when generated by the system. Thus, the attack engine is also ingesting any audit alerts from the cloud modules in the cyber security appliance that might relate to the assets the cloud enumeration component detected. (Also see FIG. 2) The architecture creation component can generate a risk score associated with the discreet cloud network itself in addition to units/assets within that discreet cloud network.

The automated sandbox generator for a cyber-attack exercise on a mimic network in a cloud environment 60 provides a completely new approach to cloud security. Previously, an asset-based approach was used, a user themselves needed to provide a list of components in the network as well as populate the details of individual assets within that network, and at most an individual asset risk was assessed. It is also novel to conceptualize and display cloud assets in this visualization, rather than simply per-subnet or other logical groupings. Finally, the cloud enumeration component algorithms are scripted to map serverless assets into the same architecture or create architectures that include and represent permissions hierarchies.

The cloud deployment component creates a sandbox in a cloud environment. There are multiple uses for the cloned network (e.g., IT network and/or cloud) environment created in the automated sandbox generator for a cyber-attack exercise on a mimic network in a cloud environment 60, namely:

Testing how known vulnerability exploits would appear to the cybersecurity system as a form of testing detection capabilities in the cloned customer environment without affecting their actual client environment;

Testing whether a client environment is vulnerable to a given exploit in the cloned customer environment without affecting their actual client environment;

Allowing inexperienced cloud administrators (e.g., human cyber security professionals) to observe how cloud exploits manifest in the cloned customer environment in a safe sandbox environment; and Allowing SOC teams (e.g., human cyber security professionals) to rehearse incident response with the components (e.g., cyber security appliance, restoration engine, prevent cyber-attack simulator, autonomous response engine) making up the cyber security system protecting their own network with those inputs being fed into and their efforts back out of the cloned customer environment.

Wargaming in the Cloud

The automated sandbox generator for a cyber-attack exercise on a mimic network in a cloud environment 60 offers the option to create short-lived clones of standard cloud systems, or those replicating the client's system, in a separate and sandboxed environment for the purposes of wargaming attacks in the cloud. (Also, see FIG. 4)

At a minimum, the architecture store offers the ability to store a standardized set of common cloud architectures as well as exact cloud architecture of the client, the cloud deployment component offers the ability to deploy the standardized set of common cloud architectures as well as exact cloud architecture of the client, the attack engine offers the ability to launch a standardized set of attacks, and user interface component to interact with the components making up the cloned customer environment during the wargaming exercise and review the results mirroring the same experience from the cyber security appliance and other components making up the cyber security system protecting their real network and cloud environment. As an extension, customer users are offered a level of access into the components making up the cloned customer environment in this sandbox to try and mitigate attacks in process.

The user interface in the automated sandbox generator for a cyber-attack exercise on a mimic network in a cloud environment 60 cooperating with the architecture store and the cloud deployment component offers to create small clones of areas of the client's real cloud environment—"architectures"—(e.g., a specific subset of cloud and/or network components mimicking the real customer's environment) utilizing data collected by the system components. The cloud enumeration component is configured to identify all assets in the cloud environment. The architecture creation component constructs an architecture which collates these assets into logical blocks based upon metadata it discovers.

The human cyber security professional/user through the user interface component can then select an architecture to clone into the sandbox which is communicated with the cloud deployment component. The human cyber security professional/user through the user interface component can then select to test a series of preprogrammed attacks against the cloned customer environment in the sandbox which is communicated with the attack engine. The human cyber security professional/user through the user interface component can observe how the cyber security appliance monitoring may display relevant alerts, and potentially how the autonomous response engine and/or restoration engine may step in to cut off activity. The attack engine offers a generic automated attack system of different types of cyber-attacks offered that may be standardized following scripted out attacks, and/or created using the input from the human cyber security professional.

Automated Attacks

The attack engine has a library of automated attacks that can be created in this wargame environment as well as a component that simplifies the creation of new attacks. Attack components have been reduced to a simple schema which can then be defined in a JSON format, allowing operators to customize the format of attacks to greater mimic cyber threat attacks from, for example, known Advanced Persistent Threat groups. The attack engine may import information from the prevent cyber threat simulator component to assemble the most "key" path based upon the known exploits available in the real environment that the clone customer network environment is based upon.

Automated CVE and Attack Surface Testing

The automated sandbox generator for a cyber-attack exercise on a mimic network in a cloud environment 60 creates a temporary virtual wargame environment. The cloned network environment may be used to test what the cyber security appliance protecting the organization's environment would observe if a given CVE was exploited in the client environment, and feed this information back to the parent Darktrace environment to look for in future traffic or network behavior. These "smart" fingerprints are tailored to the known pattern of life of the customer environment, exact data about the services operating in those customer environments, exact network security policies implemented by this particular organization, etc., so is not directly applicable to other organization's network/cloud environments. The smart fingerprint can be a recording and list of model breaches associated with the cyber threat/exploit and feed this information back to both the real cyber security appliance so it can better recognize this cyber threat/exploit; and thus, lower the deviation differences and/or increase the threat score as partial combinations of this set of model breaches start occurring. These smart fingerprints are tailored to the known pattern of life of the customer's environment and model breaches corresponding to the cyber-attacks tested in the wargaming exercise. These smart fingerprints are a behavioral outline of how a certain malicious act, like a certain cyber threat attack played out. Thus, the detector in the cyber security appliance will see these types of host names, and the detector will see this kind of behavior pattern based on the network security policies implemented in that customer environment. The monitoring components and/or recording components can create these "smart" fingerprints of a particular type of cyber threat attack based upon a wargaming exercise conducted in the cloned customer environment. From that "smart" fingerprints of a particular type of cyber threat attack based upon a wargaming exercise provides a recorded list of model breaches, you will see this kind of traffic, this kind of endpoint being called, and that this fingerprint of different aspects observed is essentially a hallmark of how a certain exploit/cyber threat attack would behave in this particular network.

Finally, the cloud deployment component can cooperate with the prevent cyber-attack simulator and Attack Surface Monitoring to spin up example infrastructure components in the cloned environment that mimics the client environment to identify if the software on those instances is demonstrably exploitable so that this information is then passed to the "Newsroom" component.

The cloud deployment component spins up virtual clones of network devices in the cloud as a testing ground for vulnerabilities & as a wargame environment in a sandbox. The cyber security appliance can cooperate with an automated sandbox generator for a cyber-attack exercise on a mimic network in a cloud environment 60 that spins up virtual clones of network devices in the cloud.

The automated sandbox generator for a cyber-attack exercise on a mimic network in a cloud environment 60 via the UI component and attack engine experiment with new CVEs to test. The cloud deployment component spins up an environment, and configures the endpoints for vulnerability, the attack engine downloads the malicious payload into the clone environment and runs the attack. The monitoring component collects data to determine how the cyber security appliance and other cyber security engines react to the latest emerging threats.

The attack engine may import information to experiment with vulnerabilities found by the attack surface manager (identifying assets in your network exposed to an external attack). Once vulnerabilities are identified in the attack surface manager (e.g., automated discovery of the assets in your network attack surface, and detects and monitors the risks within), determine if automatic VPC configuration is possible such that the sandbox can be deployed to mimic vulnerability. The attack engine may also identify malware capable of leveraging vulnerabilities and deploy to test limits of the cyber security appliance.

The cloud deployment component references the architecture store to spin up virtual clones of network devices in the cloud as a wargame environment. The cloud enumeration component analyzes an existing real network and cloud environment and tries to determine the details of the component making up that network and cloud environment so that the architecture store can store the details needed to spine up virtual clones of network devices in the cloud and let the user interface create an instance of a new tenant in the cloud provider to create the sandboxed.

The cloud deployment component cooperates with the attack engine to create environments that are actively being attacked by a cyber threat, versus a simulation of a cyber-attack on a simulator, and the autonomous response engine, heal/restoration engine, and human cyber security professional can interact with to defend in real time. (Also see FIG. 5) The automated sandbox generator for a cyber-attack exercise on a mimic network in a cloud environment 60 that spines up virtual clones of network devices in the cloud allows a user to take a network and run a wargame exercise of the attack to see how the organization's actual cyber threat defenses do, while giving the SOC human cyber security professionals a safe but not restricted environment to do training in and test configs.

The automated sandbox generator for a cyber-attack exercise on a mimic network in a cloud environment 60 that spins up virtual clones of network devices in the cloud can be used as a training tool that is made/customized in the virtual clones spun up and traffic data to be relevant for this particular organization's network including its IT and Cloud based components because the cloned network in the sandbox emulates its normal patterns of life of this actual network and provides a more focused training.

The automated sandbox generator for a cyber-attack exercise on a mimic network in a cloud environment 60 can use a cloud architecture-based approach to cloud security to protect from cyber threats. Above, the system mapped out discrete cloud architectures and computed a risk score. Next, the architecture creation component can provide a method of automatically deriving the purpose of an architecture in the cloud based upon an image analysis of the diagram in comparison to other known architectures. Above, the system generated these cloud architecture diagrams. In cloud architecture diagrams the symbols (the same icons come up over and over again) and nomenclature of assets making up a diagram of a discrete cloud architecture is fairly standardized; and thus, easily recognized by a trained AI classifier and/or referenceable in a database.

A bot can do an internet search (e.g., Google search) for the cloud architecture diagrams and/or AWS architecture diagrams and download the results. Another technique is scraping GitHub for repositories that have images present and have cloud architecture diagrams, and also have keywords. Next, the architecture creation component can then label diagrams where we know the purpose or diagrams where we have labeled them with the natural language processing estimation of the readme file use those labeled diagrams to train and some supervised machine learning upon. After training, then the architecture creation component can use a Convolutional Neural Network, an AI classifier, etc. the cloud network diagram and get the Convolutional Neural Network or an AI classifier to predict what the cloud network does based upon what it has learned.

The method can perform several functions including the following:

Scrape the internet for cloud architecture diagrams such as GitHub for IaaS repositories that have images present and key words.

Identify repositories that have IaaS infrastructure spin up code.

Identify a subset of that which have cloud network architecture diagrams (requires training a convolutional neural network (CNN) to recognize cloud architecture diagram images). An aspect can use computer vision to identify and recognize patterns and symbols in the diagrams. The system trains the CNNs to recognize different types of cloud network architecture diagrams and different components within it.

Use the code in the cloud deployment component to spin up resources.

Use ADA in the cloud enumeration component (as discussed above) to enumerate and generate our graphical representation of the discreet cloud network under analysis.

The architecture creation component can use a graph similarity algorithm to check how similar it is. The graph similarity algorithm compares the one or more cloud architectures that the system found on GitHub to the cloud architecture that the system generated itself. The architecture creation component can figure out how to determine whether the cloud network architectures are similar compared to one or more candidate networks and then is trained to generate a score/probability/etc.

If it is similar enough, use a natural language processing algorithm to summarize the README to identify the purpose of the cloud architecture. The architecture store can store the architecture and the purpose. If the repo is one that follows good practices use store that.

The automated sandbox generator for a cyber-attack exercise on a mimic network in a cloud environment 60 can now identify good (secure) architectures, make an educated guess on the intention of the architecture, and identify possible flaws or anomalies in the architecture. The architecture creation component can decide on the risk/importance of the architecture; and therefore, prioritize vulnerabilities. The architecture creation component cooperating with the architecture store can compare architectures across the fleet to work out common variations of the same base architecture. The attack engine can have a static list of common issues with architectures of a type and check them.

Figure 2:
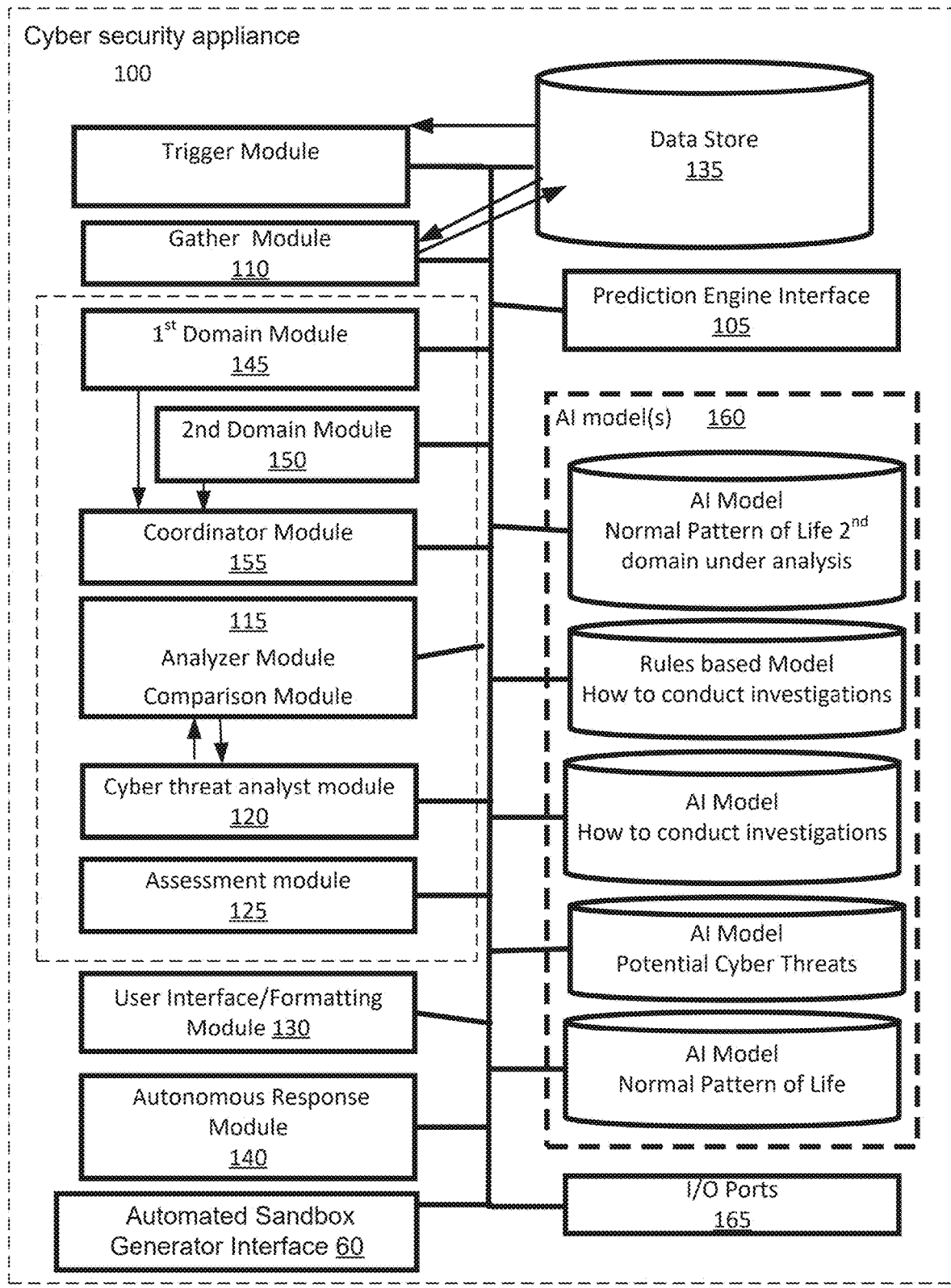
FIG. 2 illustrates a block diagram of an embodiment of the AI-based cyber security appliance with example components making up a detection engine that protects a system, including but not limited to a network/domain, from cyber threats with an interface to the automated sandbox generator for a cyber-attack exercise on a mimic network.

FIG. 2 illustrates a block diagram of an embodiment of the AI-based cyber security appliance with example components making up a detection engine that protects a system, including but not limited to a network/domain, from cyber threats with an interface to the automated sandbox generator for a cyber-attack exercise on a mimic network. Various Artificial Intelligence models and modules of the cyber security appliance 100 cooperate to protect a system, such as one or more networks/domains under analysis, from cyber threats. As shown, according to one embodiment of the disclosure, the AI-based cyber security appliance 100 may include a trigger module, a gather module 110, an analyzer module 115, a cyber threat analyst module 120, an assessment module 125, a user interface and formatting module 130, a data store 135, an autonomous response module 140 and/or an interface to an autonomous response engine 140, a first ($1^{st}$) domain module 145, a second ($2^{nd}$) domain module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, an interface to automated sandbox generator for a cyber-attack exercise on a mimic network 60, an interface to a restoration engine 190, an interface to a prediction engine 105, and other similar components.

The cyber security appliance 100 includes a set of modules cooperating with one or more Artificial Intelligence models configured to perform a machine-learned task of detecting a cyber threat incident forming the cyber threat detection engine. The prediction engine 105 uses the set of modules cooperating with the one or more Artificial Intelligence models to detect anomalous behavior of one or more nodes, including at least user accounts, devices, and versions of source code files, in a graph of a system being protected. The prediction engine 105 uses the set of modules cooperating with the one or more Artificial Intelligence models to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, an IT network domain module (e.g., first domain module 145) may communicate with network sensors to monitor network traffic going to and from the computing devices on the network as well as receive secure communications from software agents embedded in host computing devices/containers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories.

The analyzer module 115 can cooperate with the AI model(s) 160 or other modules in the cyber security appliance 100 to confirm a presence of a cyberattack against one or more domains in an enterprise's system (e.g., see system/enterprise network 50 of FIG. 5). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response module 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model (s) 160 trained with machine learning on the normal pattern of life of entities in the system. For example, as shown in FIG. 4, the cyber threat analyst module 120 may perform several additional rounds 400 of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 1, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 4 and a chain of linked low-level indicators, including abnormal behavior compared to the normal pattern of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response module 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc. a trigger to start an investigation from an external source.

Many other model breaches of the AI model(s) 160 trained with machine learning on the normal behavior of the system can send an input into the cyber threat analyst module 120 and/or the trigger module to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicate a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine works with the assessment module in the detection engine when the cyber threat is detected and autonomously takes one or more actions to mitigate the cyber threat. FIG. 2 shows the example components making up the detection engine to include interfaces to the prediction engine 105, the autonomous response engine 140, and the restoration engine, and the interface for secure communications with the automated sandbox generator 60.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

Figure 3:
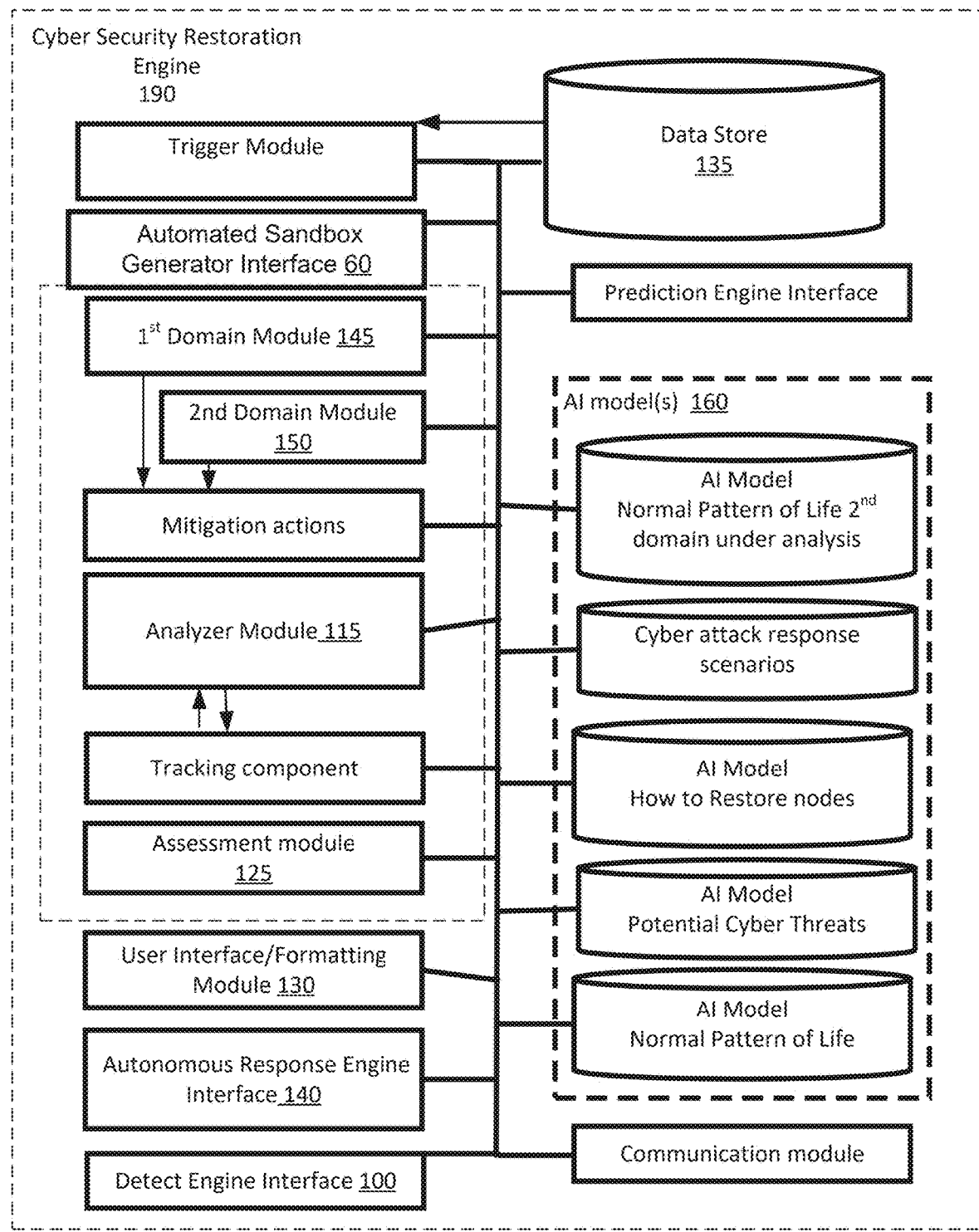
FIG. 3 illustrates a block diagram of an embodiment of the AI-based cyber security appliance with example components making up a cyber security restoration (e.g., self-healing) engine that takes one or more autonomous remediation actions to recover from a cyberattack from a cyber threat with an interface to the automated sandbox generator for a cyber-attack exercise on a mimic network.

FIG. 3 illustrates a block diagram of an embodiment of the AI-based cyber security appliance with example components making up a cyber security restoration (e.g., self-healing) engine that takes one or more autonomous remediation actions to recover from a cyberattack from a cyber threat with an interface to the automated sandbox generator for a cyber-attack exercise on a mimic network. Note, similarly named components in the cyber security restoration engine can operate and function similar to as described for the detection engine 100.

The cyber security restoration engine 190 is configured to take one or more remediation actions based on configured and/or Artificial Intelligence assistance to remediate the one or more nodes in the graph of the system being protected back to a trusted operational state in a recovery from the cyber threat. These actions might be fully automatic, or require a specific human confirmation decision before they begin.

The cyber security restoration engine 190 is configured to cooperate with the other AI-based engines of the cyber security system, via the interfaces and/or direct integrations, to track and understand the cyber threat identified by the other components as well as track the one or more mitigation actions taken to mitigate the cyber threat during the cyber-attack by the other components in order to assist in intelligently restoring the protected system while still mitigating the cyber threat attack back to a trusted operational state; and thus, as a situation develops with an ongoing cyberattack, the cyber security restoration engine is configured to take one or more remediation actions to remediate (e.g. restore) at least one of the nodes in the graph of the protected system back to a trusted operational state while the cyberattack is still ongoing.

The cyber security restoration engine 190 has a tracking component that includes at least one of i) a database to keep a record and track an operational state of each node in the graph of the protected system, ii) an Artificial Intelligence model trained to track the operational state of each node in the graph of the protected system, iii) a query to another artificial intelligence based engine that tracks the operational state of each node in the graph of the protected system from a different perspective, and iv) a combination of any of these, so that the cyber security restoration engine can then take the one or more autonomous remediation actions to remediate each particular node (e.g. user account and/or device) back to a trusted operational state for that node.

The cyber security restoration engine 190 can cooperate with the other Artificial Intelligence-based engines of the cyber security system to track and understand the cyber threat identified by the other Artificial Intelligence-based engines (detection engine and/or the prediction engine) as well as track the one or more mitigation actions taken to mitigate the cyber threat during the cyberattack by an autonomous response engine and/or human cyber security team members in order to assist in intelligently restoring the protected system while still mitigating the cyber threat attack back to a trusted operational state. Thus, as a situation develops with an ongoing cyberattack, the cyber security restoration engine is configured to take the one or more remediation actions to remediate at least one of the nodes in the graph of the protected system back to a trusted operational state to restore portions of the protected system while the cyberattack is still ongoing. The cyber security restoration engine restores the affected nodes in the protected system by using incident modelling in the cyber threat analyst module (e.g., AI Analyst) to map and identify an entire lifecycle of attack, work with the AI models trained on cyber security threats in the detection engine to identify a source of the cyberattack, and recommend restore points (e.g., where in the protected system remediation action is needed).

FIG. 4 illustrates a diagram of an embodiment of a user interface component configured to communicate with the monitoring component in the automated sandbox generator for a cyber-attack exercise on a mimic network to display results of testing in the wargaming cyber-attack exercise be displayed in the user interface component, where the monitoring component is configured to utilize an existing set of artificial intelligence models trained on a normal pattern of life of entities in the organization's environment and its associated machine learning from the cyber security appliance.

FIG. 5 illustrates a diagram of an embodiment of an example an Artificial Intelligence augmented and adaptive interactive response loop between the example four Artificial Intelligence-based engines and the automated sandbox generator for a cyber-attack exercise on a mimic network in a cloud environment. The Artificial Intelligence augmented and adaptive interactive response loop exists between the multiple Artificial Intelligence-based engines. The example multiple Artificial Intelligence-based engines cooperating with each other can include i) the cyber threat detection engine 100, ii) an autonomous response engine 140, iii) a cyber-security restoration engine 190, and iv) a prediction engine 105. i) The cyber threat detection engine 100 can be configured to use Artificial Intelligence algorithms trained to perform a machine-learned task of detecting the cyber threat. (See for example FIG. 2) ii) The autonomous response engine 140 can be configured to use Artificial Intelligence algorithms trained to perform a machine-learned task of taking one or more mitigation actions to mitigate the cyber threat. iii) The cyber-security restoration engine 190 can be configured to use Artificial Intelligence algorithms trained to perform a machine-learned task of remediating the system being protected back to a trusted operational state. (See for example FIG. 3) iv) The prediction engine 105 can be configured to use Artificial Intelligence algorithms trained to perform a machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack.

The multiple Artificial Intelligence-based engines have communication hooks in between them to exchange a significant amount of behavioral metrics including data between the multiple Artificial Intelligence-based engines to work in together to provide an overall cyber threat response.

The multiple Artificial Intelligence-based engines can be configured to cooperate to combine an understanding of normal operations of the nodes, an understanding emerging cyber threats, an ability to contain those emerging cyber threats, and a restoration of the nodes of the system to heal the system with an adaptive feedback between the multiple Artificial Intelligence-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information.

One or more Artificial Intelligence models in the detection engine can be configured to maintain what is considered to be normal behavior for that node, which is constructed on a per node basis, on the system being protected from historical data of that specific node over an operation of the system being protected.

The multiple Artificial Intelligence-based engines each have an interface to communicate with the other separate Artificial Intelligence-based engines configured to understand a type of information and communication that the other separate Artificial Intelligence-based engine needs to make determinations on an ongoing cyberattack from that other Artificial Intelligence-based engine's perspective. Each Artificial Intelligence-based engine has an instant messaging system to communicate with a human cyber-security team to keep the human cyber-security team informed on actions autonomously taken and actions needing human approval as well as generate reports for the human cyber-security team. As discussed, the inputs and commands from each of these engines during the wargaming exercise on the mimic network is communicated through the interfaces and implemented on the mimic network in the automated sandbox generator 60.

An embodiment of i) the cyber threat detection engine using Artificial Intelligence algorithms trained to perform a first machine-learned task of detecting the cyber threat, ii) an autonomous response engine using Artificial Intelligence algorithms trained to perform a second machine-learned task of taking one or more mitigation actions to mitigate the cyber threat, iii) a cyber-security restoration engine using Artificial Intelligence algorithms trained to perform a third machine-learned task of remediating the system being protected back to a trusted operational state, and iv) a prediction engine using Artificial Intelligence algorithms trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack, in order for these four Artificial Intelligence-based engines to work together. In addition, the intelligent orchestration component can use Artificial Intelligence algorithms trained to perform a fifth machine-learned task of adaptive interactive response between the multiple Artificial Intelligence-based engines to provide information each Artificial Intelligence engine needs to work cohesively to provide an overall incidence response that mitigates different types of cyber threats while still minimizing an impact tailored to this particular system being protected. For example, when a conversation occurs between the AI-based engines such as a system that can be positively affected by both proposed mitigation actions and proposed restoration actions, any of which might be attempted but fail or only partially succeed, then the intelligent orchestration component can arbitrate and evolve the best result for this particular system being protected. The intelligent orchestration component can help anticipate i) the needs of and ii) cohesive response of each Artificial Intelligence-based engine based on a current detected cyber threat.

The cyber-security restoration engine receives and sends inputs through communication hooks (e.g.) interfaces to all of these Artificial Intelligence-based engines each configured with self-learning AI machine learning algorithms to, respectively, i) to detect the cyber threat, ii) to respond to mitigate that cyber threat, and iii) to predict how that cyber threat might occur and likely progress through simulations. Each of these Artificial Intelligence-based engines has bi-directional communications, including the exchange of raw data, with each other as well as with software agents resident in physical and/or virtual devices making up the system being protected as well as bi-directional communications with sensors within the system being protected. Note, the system under protection can be, for example, an IT network, an OT network, a Cloud network, an email network, a source code database, an endpoint device, etc.

In an example, the autonomous response engine uses its intelligence to cooperate with a cyber threat prediction engine and its Artificial Intelligence-based simulations to choose and initiate an initial set of one or more mitigation actions indicated as a preferred targeted initial response to the detected cyber threat by autonomously initiating those mitigation actions to defend against the detected cyber threat, rather than a human taking an action. The autonomous response engine, rather than the human taking the action, is configured to autonomously cause the one or more mitigation actions to be taken to contain the cyber threat when a threat risk parameter from an assessment module in the detection engine is equal to or above an actionable threshold. Example mitigation actions can include 1) the autonomous response engine monitoring and sending signals to a potentially compromised node to restrict communications of the potentially compromised node to merely normal recipients and types of communications according to the Artificial Intelligence model trained to model the normal pattern of life for each node in the protected system, 2) the autonomous response engine trained on how to isolate a compromised node as well as to take mitigation acts with other nodes that have a direct nexus to the compromised node.

In another example, the cyber threat prediction engine and its Artificial Intelligence-based simulations use intelligence to cooperate with the cyber-security restoration engine to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state.

In another example, the cyber security restoration engine restores the one or more nodes in the protected system by cooperating with at least two or more of 1) an Artificial Intelligence model trained to model a normal pattern of life for each node in the protected system, 2) an Artificial Intelligence model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response engine.

FIG. 6 illustrates a block diagram of an embodiment of the prediction engine with Artificial Intelligence-based simulations conducted in the prediction engine by constructing a graph of nodes of the system being protected (e.g. a network including i) the physical devices connecting to the network, any virtualized instances of the network, user accounts in the network, email accounts in the network, etc. as well as ii) connections and pathways through the network) to create a virtualized instance of the network to be tested. As shown in FIG. 6, the various cooperating modules residing in the prediction engine 105 may include, but are not limited to, a collections module 705, a cyberattack generator (e.g. phishing email generator with a paraphrasing engine) 702, an email module 715, a network module 720, an analyzer module 725, a payloads module 730 with first and second payloads, a communication module 735, a training module 740, a simulated attack module 750, a cleanup module 755, a scenario module 760, a user interface 765, a reporting module, a formatting module, an orchestration module, an AI classifier with a list of specified classifiers.

The prediction engine 105 may be implemented via i) a simulator to model the system being protected and/or ii) a clone creator to spin up a virtual network and create a virtual clone of the system being protected configured to pentest one or more defenses provided by scores based on both the level of confidence that the cyber threat is a viable threat and the severity of the cyber threat (e.g., attack type where ransomware attacks has greater severity than phishing attack; degree of infection; computing devices likely to be targeted, etc.). The threat risk scores be used to rank alerts that may be directed to enterprise or computing device administrators. This risk assessment and ranking is conducted to avoid frequent "false positive" alerts that diminish the degree of reliance/confidence on the cyber security appliance 100. The prediction engine 105 may include and cooperate with one or more AI models trained with machine learning on the contextual knowledge of the organization. These trained AI models may be configured to identify data points from the contextual knowledge of the organization and its entities, which may include, but is not limited to, language-based data, email/network connectivity and behavior pattern data, and/or historic knowledgebase data. The prediction engine 105 may use the trained AI models to cooperate with one or more AI classifier(s) by producing a list of specific organization-based classifiers for the AI classifier. The prevent engine 105 is further configured to calculate, —based at least in part on the results of the one or more hypothetical simulations of a possible cyberattack and/or of an actual ongoing cyberattack from a cyber threat determine a risk score for each node (e.g. each device, user account, etc.), the threat risk score being indicative of a possible severity of the compromise prior to an autonomous response action is taken in response to the actual cyberattack of the cyber incident.

FIG. 7 illustrates a diagram of an embodiment of the cyber threat prediction engine and its Artificial Intelligence-based simulations constructing an example graph of nodes and attack path modeling in an example network and simulating how the cyberattack might likely progress in the future tailored with an innate understanding of a normal behavior of the nodes in the system being protected and a current operational state of each node in the graph of the protected system during simulations of cyberattacks based upon attack path modelling. The prediction engine 105 plots the attack path through the nodes and estimated times to reach critical nodes in the network. The cyberattack simulation modeling is run to identify the routes, difficulty, and time periods from certain entry notes to certain key servers.

Again, similarly named components in each Artificial Intelligence-based engine can 1) perform similar functions and/or 2) have a communication link from that component located in one of the Artificial Intelligence-based engines and then information is needed from that component is communicated to another Artificial Intelligence-based engine that through the interface to that Artificial Intelligence-based engine.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI model(s) 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g., user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior—packet traffic and network activity/processes including server access, data volumes, timings of events, credential use, connection type, volume, and directionality of, for example, uploads/downloads into the network, file type, packet intention, admin activity, resource and information requests, command sent, etc.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example, Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 2 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign', the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly detection can discover unusual data points in your dataset. Anomaly can be a synonym for the word 'outlier'.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric Additional Module Interactions Referring back to FIG. 2, the gather module 110 cooperates with the data store 135. The data store 135 stores comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may consist of multiple automatic data gatherers that each look at different aspects of the data depending on the particular hypothesis formed for the analysed event. The data relevant to each type of possible hypothesis can be automatically pulled from additional external and internal sources. Some data is pulled or retrieved by the gather module 110 for each possible hypothesis.

The data store 135 can store the metrics and previous threat alerts associated with network traffic for a period of time, which is, by default, at least 27 days. This corpus of data is fully searchable. The cyber security appliance 100 works with network probes to monitor network traffic and store and record the data and metadata associated with the network traffic in the data store.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the first domain module 145 may operate as an IT network module configured to receive information from and send information to, in this example, IT network-based sensors (i.e., probes, taps, etc.). The first domain module 145 also has algorithms and components configured to understand, in this example, IT network parameters, IT network protocols, IT network activity, and other IT network characteristics of the network under analysis. The second domain module 150 is, in this example, an email module. The second domain module 150 can be an email network module configured to receive information from and send information to, in this example, email-based sensors (i.e., probes, taps, etc.). The second domain module 150 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI models(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

The cyber threat analyst module using AI models, scripts and/or rules-based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioural pattern analysis of what are the unusual behaviours of the network/system/device/user under analysis by the machine learning models may be as follows. The coordinator module can tie the alerts, activities, and events from, in this example, the email domain to the alerts, activities, and events from the IT network domain. FIG. 8 illustrates a graph 220 of an embodiment of an example chain of unusual behaviour for, in this example, the email activities and IT network activities deviating from a normal pattern of life in connection with the rest of the system/network under analysis. The cyber threat analyst module and/or analyzer module can cooperate with one or more machine learning models. The one or more machine learning models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analysed to determine whether that activity is unusual or suspicious. A chain of related activity that can include both unusual activity and activity within a pattern of normal life for that entity can be formed and checked against individual cyber threat hypothesis to determine whether that pattern is indicative of a behaviour of a malicious actor—human, program, or other threat. The cyber threat analyst module can go back and pull in some of the normal activities to help support or refute a possible hypothesis of whether that pattern is indicative of a behavior of a malicious actor. An example behavioral pattern included in the chain is shown in the graph over a time frame of, an example, 7 days. The cyber threat analyst module detects a chain of anomalous behavior of unusual data transfers three times, unusual characteristics in emails in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three emails with unusual characteristics. Again, the cyber security appliance 100 can go back and pull in some of the normal activities to help support or refute a possible hypothesis of whether that pattern is indicative of a behaviour of a malicious actor. The analyser module can cooperate with one or more models trained on cyber threats and their behaviour to try to determine if a potential cyber threat is causing these unusual behaviours. The cyber threat analyst module can put data and entities into 1) a directed graph and nodes in that graph that are overlapping or close in distance have a good possibility of being related in some manner, 2) a vector diagram, 3) a relational database, and 4) other relational techniques that will at least be examined to assist in creating the chain of related activity connected by causal links, such as similar time, similar entity and/or type of entity involved, similar activity, etc., under analysis. If the pattern of behaviours under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviours under analysis, that are equal to or above a configurable level of threat posed by this malicious actor.

The autonomous response engine of the cyber security system is configured to take one or more autonomous mitigation actions to mitigate the cyber threat during the cyberattack by the cyber threat. The autonomous response engine is configured to reference an Artificial Intelligence model trained to track a normal pattern of life for each node of the protected system to perform an autonomous act of restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

In the next step, the assessment module with the AI classifiers, once armed with the knowledge that malicious activity is likely occurring/is associated with a given process from the analyzer module, then cooperates with the autonomous response engine to take an autonomous action such as i) deny access in or out of the device or the network and/or ii) shutdown activities involving a detected malicious agent.

The autonomous response engine, rather than a human taking an action, can be configured to cause one or more rapid autonomous mitigation actions to be taken to counter the cyber threat. A user interface for the response module can program the autonomous response engine i) to merely make a suggested response to take to counter the cyber threat that will be presented on a display screen and/or sent by a notice to an administrator for explicit authorization when the cyber threat is detected or ii) to autonomously take a response to counter the cyber threat without a need for a human to approve the response when the cyber threat is detected. The autonomous response engine will then send a notice of the autonomous response as well as display the autonomous response taken on the display screen. Example autonomous responses may include cut off connections, shutdown devices, change the privileges of users, delete and remove malicious links in emails, slow down a transfer rate, and other autonomous actions against the devices and/or users. The autonomous response engine uses one or more Artificial Intelligence models that are configured to intelligently work with other third-party defense systems in that customer's network against threats. The autonomous response engine can send its own protocol commands to devices and/or take actions on its own. In addition, the autonomous response engine uses the one or more Artificial Intelligence models to orchestrate with other third-party defense systems to create a unified defense response against a detected threat within or external to that customer's network. The autonomous response engine can be an autonomous self-learning response coordinator that is trained specifically to control and reconfigure the actions of traditional legacy computer defenses (e.g., firewalls, switches, proxy servers, etc.) to contain threats propagated by, or enabled by, networks and the internet. The cyber threat module can cooperate with the autonomous response engine to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

FIG. 5 illustrates a diagram of an example first stage of the interactive Artificial Intelligence-based response loop between the multiple Artificial Intelligence-based engines working in tandem to provide an overall cyber threat response. The human security team is just working through these top cyber threat risks identified by the prediction engine simulations, while the AI detection engine looks for cyber threats.

The detection engine monitoring the example network being protected detects a potential cyber threat. The detection engine informs all the other engines of the new detection and details (e.g., the symptoms detected and any devices possibly compromised). The detection engine also sends a report to the human security team to review.

The detection engine detects a cyberattack through AI analysis and communicates the cyber threat and one or more nodes (user accounts, devices, etc.) showing anomalous behavior indicative of being compromised by the cyber threat to the autonomous response engine. The detection engine communicates to the autonomous response engine about all the cyber events and indicated nodes that need containing, even the ones that potentially individually seem normal.

The autonomous response engine reviews the information from the detection engine to take one or more autonomous actions to mitigate the cyberattack. The artificial intelligence in the autonomous response engine determines what additional information the autonomous response engine needs to take the one or more autonomous actions to mitigate the cyberattack while still minimizing an effect on the rest of the non-compromised nodes in the system and other mitigation actions needed to contain the cyber threat. The autonomous response engine reasons and acts, e.g., blocking specific network connections, enforcing a pattern of life on users/devices, and locking accounts. The autonomous response engine is trained to mitigate the cyber threat and compromised nodes with the minimum number of changes to achieve that goal, and with a minimum disruption to legitimate on-going operations The detection engine detects a cyberattack through AI analysis and also communicates the cyber threat and one or more nodes (user accounts, devices, etc.) showing anomalous behavior indicative of being compromised by the cyber threat to the prediction engine. The prediction engine reviews the information and runs one or more Artificial Intelligence-based simulations of cyberattacks to assist in determining 1) how this cyberattack might have occurred in the system being protected, and 2) using the cyberattack information from the detection engine to run simulations to preempt possible escalations of this ongoing actual cyberattack. The prediction engine reviews the information from the detection engine and the artificial intelligence in the prediction engine determines what additional information the prediction engine needs to run one or more simulations of this cyberattack. The prediction engine reasons, based on the one or more possible cyberattacks detected from the events and indicators detected, the likely next set of actions that might take place in the attack—especially the actions that would constitute the most dangerous escalations.

The prediction engine communicates with the autonomous response engine to supplement the actions and events it can take to mitigate the cyberattack based on the simulations. Again, the autonomous response engine reasons and acts.

The autonomous response engine communicates with the restoration engine what autonomous actions have been taken to mitigate the cyber threat. The autonomous response engine communicates e.g., that a specific device and account are being contained now, and restoration is therefore less urgent. The restoration engine pulls information from the detection engine to determine an operational state for each node in the system being protected. The artificial intelligence in the restoration engine analyzes the operational state of the nodes in the network/system being protected. The artificial intelligence in the restoration engine analyzes the operational state of the nodes and what level of mitigation might be needed to contain the cyber threat during this ongoing cyberattack. The artificial intelligence in the restoration engine also analyzes the information from the Artificial Intelligence-based simulations of cyberattacks to assist in determining what level of restrictions are needed on the potentially compromised nodes and their neighboring nodes to still mitigate against an ongoing cyberattack but minimize an effect on the rest of the system.

In an example, the autonomous response engine can stop a device that is infected from connecting to other nodes. In addition, the autonomous response engine can restrict reading and writing traffic and/or types of data/information being communicated in that traffic to restrict traffic movement and process activity to nodes close to an entity that the system thinks is performing erroneously or infected.

Referring to FIG. 4, the autonomous response engine 140 is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine 140 can have a discovery module to i) discover capabilities of each node being protected device and the other cyber security devices (e.g., firewalls) in the system being protected and ii) discover mitigation actions they can take to counter and/or contain the detected threat to the system being protected, as well as iii) discover the communications needed to initiate those mitigation actions.

For example, the autonomous response engine cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine will take an autonomous mitigation action to, for example, shutdown the device or user account, block login failures, perform file modifications, block network connections, restrict the transmission of certain types of data, restrict a data transmission rate, remove or restrict user permissions, etc. The autonomous response engine for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine 140 has a default set of autonomous mitigation actions shown on its user interface that it knows how to perform when the different types of cyber threats are equal to or above a user configurable threshold posed by this type of cyber threat. The autonomous response engine is also configurable in its user interface to allow the user to augment and change what type of automatic mitigation actions, if any, the autonomous response engine may take when different types of cyber threats that are equal to or above the configurable level of threat posed by a cyber threat.

The autonomous response engine can also reference its artificial intelligence trained to perform mitigation actions. Again, the autonomous response engine 140 has an administrative tool in its user interface to program/set what autonomous mitigation actions the autonomous response engine can take, including types of mitigation actions and specific mitigation actions the autonomous response engine is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine can also reference a default library of mitigation actions, types of mitigation actions and specific mitigation actions the autonomous response engine is capable of on a particular node.

Referring to FIG. 6, the prediction engine 105 using Artificial Intelligence-based simulations is communicatively coupled to a cyber security appliance 100, an open source (OS) database server 790, an email system 796, one or more endpoint computing devices 791A-B, and an IT network system 792 with one or more entities, over one or more networks 791/792 in the system being protected and the automated sandbox generator for a cyber-attack exercise on a mimic network 60.

The prediction engine 105 with Artificial Intelligence-based simulations is configured to integrate with the cyber security appliance 100 and cooperate with components within the cyber security appliance 100 installed and protecting the network from cyber threats by making use of outputs, data collected, and functionality from two or more of a data store, other modules, and one or more AI models already existing in the cyber security appliance 100.

The prediction engine 105 may include a cyber threat generator module to generate many different types of cyber threats with the past historical attack patterns to attack the simulated system to be generated by the simulated attack module that will digitally/virtually replicate the system being protected, such as a phishing email generator configured to generate one or more automated phishing emails to pentest the email defenses and/or the network defenses provided by the cyber security appliance 100. For example, the system being protected can be an email system and then the phishing email generator may be configured to cooperate with the trained AI models to customize the automated phishing emails based on the identified data points of the organization and its entities. The attack engine in the automated sandbox generator for a cyber-attack exercise on a mimic network 60 can be configured to use many of the functions and scripts utilized in the prediction engine 105 and/or cooperate through the interface with components in the prediction engine 105 to obtain this functionality.

The email module and network module may use a vulnerability tracking module to track and profile, for example, versions of software and a state of patches and/or updates compared to a latest patch and/or update of the software resident on devices in the system/network. The vulnerability tracking module can supply results of the comparison of the version of software as an actual detected vulnerability for each particular node in the system being protected, which is utilized by the node exposure score generator and the prediction engine 105 with Artificial Intelligence-based simulations in calculating 1) the spread of a cyber threat and 2) a prioritization of remediation actions on a particular node compared to the other network nodes with actual detected vulnerabilities. The node exposure score generator is configured to also factor in whether the particular node is exposed to direct contact by an entity generating the cyber threat (when the threat is controlled from a location external to the system e.g., network) or the particular node is downstream of a node exposed to direct contact by the entity generating the cyber threat external to the network.

The node exposure score generator and the simulated attack module in the prediction engine 105 cooperate to run the one or more hypothetical simulations of an actual detected cyber threat incident and/or a hypothetical cyber-attack incident to calculate the node paths of least resistance in the virtualized instance/modeled instance of the system being protected. The progress through the node path(s) of least resistance through the system being protected are plotted through the various simulated instances of components of the graph of the system being protected until reaching a suspected end goal of the cyber-attack scenario, all based on historic knowledge of connectivity and behavior patterns of users and devices within the system under analysis. The simulated attack module, via a simulator and/or a virtual network clone creator, can be programmed to model and work out the key paths and devices in the system (e.g., a network, with its nets and subnets,) via initially mapping out the system being protected and querying the cyber security appliance on specific's known about the system being protected by the cyber security appliance 100. The simulated attack module is configured to search and query, two or more of i) a data store, ii) modules in the detection engine, and iii) the one or more Artificial Intelligence (AI) models making up the cyber security appliance 100 protecting the actual network under analysis from cyber threats, on what, i) the data store, ii) the modules, and iii) the one or more AI models in the cyber security appliance 100, already know about the nodes of the system, under analysis to create the graph of nodes of the system being protected. Thus, the prediction engine 105 with Artificial Intelligence-based simulations is configured to construct the graph of the virtualized version of the system from knowledge known and stored by modules, a data store, and one or more AI models of a cyber security appliance 100 protecting an actual network under analysis. The knowledge known and stored is obtained at least from ingested traffic from the actual system under analysis. Thus, the virtualized system, and its node components/accounts connecting to the network, being tested during the simulation are up to date and accurate for the time the actual system under analysis is being tested and simulated because the prediction engine 105 with Artificial Intelligence-based simulations is configured to obtain actual network data collected by two or more of 1) modules, 2) a data store, and 3) one or more AI models of a cyber security appliance protecting the actual network under analysis from cyber threats. The simulated attack module will make a model incorporating the actual data of the system through the simulated versions of the nodes making up that system for running simulations on the simulator. Again, a similar approach is taken when the simulated attack module uses a clone creator to spin up and create a virtual clone of the system being protected with virtual machines in the cloud.

The prediction engine 105 with Artificial Intelligence-based simulations is configured to simulate the compromise of a spread of the cyber threat being simulated in the simulated cyber-attack scenario, based on historical and/or similar cyber threat attack patterns, between the devices connected to the virtualized network, via a calculation on an ease of transmission of the cyber threat algorithm, from 1) an originally compromised node by the cyber threat, 2) through to other virtualized/simulated instances of components of the virtualized network, 3) until reaching a suspected end goal of the cyber-attack scenario, including key network devices. The prediction engine 105 with Artificial Intelligence-based simulations also calculates how likely it would be for the cyber-attack to spread to achieve either of 1) a programmable end goal of that cyber-attack scenario set by a user, or 2) set by default an end goal scripted into the selected cyber-attack scenario.

The email module and the network module can include a profile manager module. The profile manager module is configured to maintain a profile tag on all of the devices connecting to the actual system/network under analysis based on their behavior and security characteristics and then supply the profile tag for the devices connecting to the virtualized instance of the system/network when the construction of the graph occurs. The profile manager module is configured to maintain a profile tag for each device before the simulation is carried out; and thus, eliminates a need to search and query for known data about each device being simulated during the simulation. This also assists in running multiple simulations of the cyberattack in parallel.

The prediction engine 105 with Artificial Intelligence-based simulations module is configured to construct the graph of the virtualized system, e.g. a network with its nets and subnets, where two or more of the devices connecting to the virtualized network are assigned with different weighting resistances to malicious compromise from the cyber-attack being simulated in the simulated cyber-attack scenario based on the actual cyber-attack on the virtualized instance of the network and their node vulnerability score. In addition to a weighting resistance to the cyberattack, the calculations in the model for the simulated attack module factor in the knowledge of a layout and connection pattern of each particular network device in a network, an amount of connections and/or hops to other network devices in the network, how important a particular device (a key importance) determined by the function of that network device, the user(s) associated with that network device, and the location of the device within the network. Note, multiple simulations can be conducted in parallel by the orchestration module. The simulations can occur on a periodic regular basis to pentest the cyber security of the system and/or in response to a detected ongoing cyberattack in order to get ahead of the ongoing cyberattack and predict its likely future moves. Again, the graph of the virtualize instance of the system is created with two or more of 1) known characteristics of the network itself, 2) pathway connections between devices on that network, 3) security features and credentials of devices and/or their associated users, and 4) behavioral characteristics of the devices and/or their associated users connecting to that network, which all of this information is obtained from what was already know about the network from the cyber security appliance.

During an ongoing cyberattack, the simulated attack module is configured to run the one or more hypothetical simulations of the detected cyber threat incident and feed details of a detected incident by a cyber threat module in the detection engine into the collections module of the prediction engine 105 using Artificial Intelligence-based simulations. The simulated attack module is configured to run one or more hypothetical simulations of that detected incident in order to predict and assist in the triggering an autonomous response by the autonomous response engine and then restoration by the restoration engine to the detected incident.

The simulated attack module ingests the information for the purposes of modeling and simulating a potential cyber-attacks against the network and routes that an attacker would take through the network. The simulated attack module can construct the graph of nodes with information to i) understand an importance of network nodes in the network compared to other network nodes in the network, and ii) to determine key pathways within the network and vulnerable network nodes in the network that a cyber-attack would use during the cyber-attack, via modeling the cyber-attack on at least one of 1) a simulated device version and 2) a virtual device version of the system being protected under analysis. Correspondingly, the calculated likelihood of the compromise and timeframes for the spread of the cyberattack is tailored and accurate to each actual device/user account (e.g., node) being simulated in the system because the cyber-attack scenario is based upon security credentials and behavior characteristics from actual traffic data fed to the modules, data store, and AI models of the cyber security appliance.

The prediction engine 105 with its Artificial Intelligence trained on how to conduct and perform cyberattack in a simulation in either a simulator or in a clone creator spinning up virtual instances on virtual machines will take a sequence of actions and then evaluate the actual impact after each action in the sequence, in order to yield a best possible result to contain/mitigate the detected threat while minimizing the impact on other network devices and users that are i) currently active and ii) not in breach, from different possible actions to take. Again, multiple simulations can be run in parallel so that the different sequences of mitigation actions and restoration actions can be evaluated essentially simultaneously. The prediction engine 105 with Artificial Intelligence-based simulations in the prediction engine 105 is configured to use one or more mathematical functions to generate a score and/or likelihood for each of the possible actions and/or sequence of multiple possible actions that can be taken in order to determine which set of actions to choose among many possible actions to initiate. The one or more possible actions to take and their calculated scores can be stacked against each other to factor 1) a likelihood of containing the detected threat acting abnormal with each possible set of actions, 2) a severity level of the detected threat to the network, and 3) the impact of taking each possible set of actions i) on users and ii) on devices currently active in the network not acting abnormal to the normal behavior of the network, and then communicate with the cyber threat detection engine, the autonomous response engine, and the cyber-security restoration engine, respectively, to initiate the chosen set of actions to cause a best targeted change of the behavior of the detected threat acting abnormal to the normal pattern of life on the network while minimizing the impact on other network devices and users that are i) currently active and ii) not in breach of being outside the normal behavior benchmark. The prediction engine cooperates with the AI models modelling a normal pattern of life for entities/nodes in the system being protected.

The simulated attack module is programmed itself and can cooperate with the artificial intelligence in the restoration engine to factor an intelligent prioritization of remediation actions and which nodes (e.g., devices and user accounts) in the simulated instance of the system being protected should have a priority compared to other nodes. This can also be reported out to assist in allocating human security team personnel resources that need human or human approval to restore the nodes based on results of the one or more hypothetical simulations of the detected incident.

Note, the prediction engine when doing attack path modelling does not need to not calculate every theoretically possible path from the virtualized instance of the source device to the end goal of the cyber-attack scenario but rather a set of the most likely paths, each time a hop is made from one node in the virtualized network to another device in the virtualized network, in order to reduce an amount of computing cycles needed by the one or more processing units as well as an amount of memory storage needed in the one or more non-transitory storage mediums.

FIG. 4 illustrates a block diagram of an embodiment of the AI-based cyber security appliance 100 with the cyber security restoration engine and other Artificial Intelligence-based engines plugging in as an appliance platform to protect a network and that can cooperate with the automated sandbox generator for a cyber-attack exercise on a mimic network 60 during a wargaming exercise. The probes and detectors monitor, in this example, email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

FIG. 9 illustrates a block diagram of an embodiment of the AI-based cyber security appliance to mitigate the cyber threat during the cyberattack by the other Artificial Intelligence-based engines in order to assist in intelligently restoring the protected system, while still mitigating the cyber threat attack, back to the trusted operational state before indications of when the compromised started by the cyber threat attack. The Artificial Intelligence-based cyber security system can also use a cyber threat analyst module 104 to protect an example network. The example network of computer systems 50 uses a cyber security appliance 100. The system depicted is a simplified illustration, which is provided for ease of explanation. The system 50 comprises a first computer system 10 within a building, which uses the threat detection system to detect and thereby attempt to prevent threats to computing devices within its bounds.

The first computer system 10 comprises three computers 1, 2, 3, a local server 4, and a multifunctional device 5 that provides printing, scanning and facsimile functionalities to each of the computers 1, 2, 3. All of the devices within the first computer system 10 are communicatively coupled via a Local Area Network 6. Consequently, all of the computers 1, 2, 3 are able to access the local server 4 via the LAN 6 and use the functionalities of the MFD 5 via the LAN 6.

The LAN 6 of the first computer system 10 is connected to the Internet 20, which in turn provides computers 1, 2, 3 with access to a multitude of other computing devices 18 including server 30 and second computer system 40. The second computer system 40 also includes two computers 41, 42, connected by a second LAN 43.

In this exemplary embodiment of the cyber security appliance 100 with the multiple Artificial Intelligence-based engines is implemented on computer 1. Computer 1 on the first computer system 10 has the electronic hardware, modules, models, and various software processes of the cyber security appliance 100; and therefore, runs threat detection for detecting threats to the first computer system. As such, the computer system includes one or more processors arranged to run the steps of the process described herein, memory storage components required to store information related to the running of the process, as well as a network interface for collecting the required information for the probes and other sensors collecting data from the network under analysis.

The cyber security appliance 100 in computer 1 builds and maintains a dynamic, ever-changing model of the 'normal behavior' of each user and machine within the system 10. The approach is based on Bayesian mathematics, and monitors all interactions, events, and communications within the system 10—which computer is talking to which, files that have been created, networks that are being accessed.

For example, computer 2 is-based in a company's San Francisco office and operated by a marketing employee who regularly accesses the marketing network, usually communicates with machines in the company's U.K. office in second computer system 40 between 9.30 AM and midday, and is active from about 8:30 AM until 6 PM.

The same employee virtually never accesses the employee time sheets, very rarely connects to the company's Atlanta network and has no dealings in South-East Asia. The security appliance takes all the information that is available relating to this employee and establishes a 'pattern of life' for that person and the devices used by that person in that system, which is dynamically updated as more information is gathered. The model of the normal pattern of life for an entity in the network under analysis is used as a moving benchmark, allowing the cyber security appliance 100 to spot behavior on a system that seems to fall outside of this normal pattern of life, and flags this behavior as anomalous, requiring further investigation and/or autonomous action.

The cyber security appliance 100 is built to deal with the fact that today's attackers are getting stealthier and an attacker/malicious agent may be 'hiding' in a system to ensure that they avoid raising suspicion in an end user, such as by slowing their machine down. The Artificial Intelligence model(s) in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the network by analyzing data on the activity on the network at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as animals, the system analyzes the information and works out the different classes of animals. This allows the system to handle the unexpected and embrace uncertainty when new entities and classes are examined. The modules and models of the cyber security appliance 100 do not always know what they are looking for, but can independently classify data and detect compelling patterns.

The cyber security appliance's 100 unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The models in the cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The cyber security appliance 100's AI models continually recalculate threat levels in the light of new evidence, identifying changing attack behaviors where conventional signature-based methods fall down.

Training a model can be accomplished by having the model learn good values for all of the weights and the bias for labeled examples created by the system, and in this case; starting with no labels initially. A goal of the training of the model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The model representing normal behavior from a given normal training data set can detect anomalies by establishing the normal pattern and then test the likelihood of a test instance under analysis to be generated by the model. Anomaly detection can identify rare items, events or observations which raise suspicions by differing significantly from the majority of the data, which includes rare objects as well as things like unexpected bursts in activity.

The methods and systems shown in the Figures and discussed in the text herein can be coded to be performed, at least in part, by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD. The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product. For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 10 illustrates a block diagram of an embodiment of one or more computing devices that can be a part of the automated sandbox generator for a cyber-attack exercise on a mimic network and the Artificial Intelligence-based cyber security system including the multiple Artificial Intelligence-based engines discussed herein.

The computing device may include one or more processors or processing units 620 to execute instructions, one or more memories 630-632 to store information, one or more data input components 660-663 to receive data input from a user of the computing device 600, one or more modules that include the management module, a network interface communication circuit 670 to establish a communication link to communicate with other computing devices external to the computing device, one or more sensors where an output from the sensors is used for sensing a specific triggering condition and then correspondingly generating one or more preprogrammed actions, a display screen 691 to display at least some of the information stored in the one or more memories 630-632 and other components. Note, portions of this design implemented in software 644, 645, 646 are stored in the one or more memories 630-632 and are executed by the one or more processors 620. The processing unit 620 may have one or more processing cores, which couples to a system bus 621 that couples various system components including the system memory 630. The system bus 621 may be any of several types of bus structures selected from a memory bus, an interconnect fabric, a peripheral bus, and a local bus using any of a variety of bus architectures.

Computing device 602 typically includes a variety of computing machine-readable media. Machine-readable media can be any available media that can be accessed by computing device 602 and includes both volatile and non-volatile media, and removable and non-removable media. By way of example, and not limitation, computing machine-readable media use includes storage of information, such as computer-readable instructions, data structures, other executable software, or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 602. Transitory media such as wireless channels are not included in the machine-readable media. Machine-readable media typically embody computer readable instructions, data structures, and other executable software. In an example, a volatile memory drive 641 is illustrated for storing portions of the operating system 644, application programs 645, other executable software 646, and program data 647.

A user may enter commands and information into the computing device 602 through input devices such as a keyboard, touchscreen, or software or hardware input buttons 662, a microphone 663, a pointing device and/or scrolling input component, such as a mouse, trackball, or touch pad 661. The microphone 663 can cooperate with speech recognition software. These and other input devices are often connected to the processing unit 620 through a user input interface 660 that is coupled to the system bus 621, but can be connected by other interface and bus structures, such as a lighting port, game port, or a universal serial bus (USB). A display monitor 691 or other type of display screen device is also connected to the system bus 621 via an interface, such as a display interface 690. In addition to the monitor 691, computing devices may also include other peripheral output devices such as speakers 697, a vibration device 699, and other output devices, which may be connected through an output peripheral interface 695.

The computing device 602 can operate in a networked environment using logical connections to one or more remote computers/client devices, such as a remote computing system 680. The remote computing system 680 can a personal computer, a mobile computing device, a server, a router, a network PC, a peer device, or other common network node, and typically includes many or all of the elements described above relative to the computing device 602. The logical connections can include a personal area network (PAN) 672 (e.g., Bluetooth®), a local area network (LAN) 671 (e.g., Wi-Fi), and a wide area network (WAN) 673 (e.g., cellular network). Such networking environments are commonplace in offices, enterprise-wide computer networks, intranets, and the Internet. A browser application and/or one or more local apps may be resident on the computing device and stored in the memory.

When used in a LAN networking environment, the computing device 602 is connected to the LAN 671 through a network interface 670, which can be, for example, a Bluetooth® or Wi-Fi adapter. When used in a WAN networking environment (e.g., Internet), the computing device 602 typically includes some means for establishing communications over the WAN 673. With respect to mobile telecommunication technologies, for example, a radio interface, which can be internal or external, can be connected to the system bus 621 via the network interface 670, or other appropriate mechanism. In a networked environment, other software depicted relative to the computing device 602, or portions thereof, may be stored in the remote memory storage device. By way of example, and not limitation, remote application programs 685 as reside on remote computing device 680. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. A module may be implemented in hardware electronic components, software components, and a combination of both. A software engine is a core component of a complex system consisting of hardware and software that is capable of performing its function discretely from other portions of the entire complex system but designed to interact with the other portions of the entire complex system.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed.

Accordingly, departures may be made from the foregoing design and embodiments without departing from the scope afforded by the following claims, which scope is only limited by the claims when appropriately construed.

The invention claimed is:

1. An apparatus, comprising:
an automated sandbox generator for a wargaming cyber-attack exercise on a mimic network in a cloud environment, comprising:
a cloud deployment component configured to provide an automated solution to deploy the mimic network, which consists of a portion of 1) an information technology network, 2) a cloud network, 3) an email network, or 4) a combination of all three, in a sandbox environment in the cloud environment, where the mimic network is i) a clone of some subset of components from 1) the information technology network, 2) the cloud network, 3) the email network, or 4) the combination of all three, that exists in an organization's environment, ii) a subset of predefined example components found in network architectures, or iii) some combination of both, and where the cloud deployment component is further configured to utilize a sandbox creator to create the sandbox environment in the cloud environment,
an attack engine configured to deploy a cyber threat to use an exploit that can be tested and interacted with during the wargaming cyber-attack exercise in the mimic network deployed by the cloud deployment component,
a monitoring component configured to communicate with a series of sensors deployed in the mimic network in the sandbox environment in the cloud environment,
a user interface component configured to communicate with the monitoring component to display results of testing in the wargaming cyber-attack exercise be displayed in the user interface component, where the monitoring component is configured to utilize an existing set of artificial intelligence models trained on a normal pattern of life of entities in the organization's environment and its associated machine learning,
where the user interface component is configured to display, in real time, results of the wargaming cyber-attack exercise being conducted in the sandbox environment, to create a behavioral profile of how the cyber threat using the exploit would actually perform in that particular organization's environment, and
where instructions for the cloud deployment component, the attack engine, the user interface component, and the monitoring component are configured to be stored in one or more non-transitory machine readable medium to be executed by one or more processing units.

2. The apparatus of claim 1, where the attack engine is configured to interacted with the deployed cyber threat via being capable of remote control over actions taken by the cyber threat, during the wargaming cyber-attack exercise in the mimic network deployed by the cloud deployment component.

3. The apparatus of claim 1, where the user interface component is configured to mimic at least an appearance and functionality of a user interface of a cyber security appliance protecting the 1) information technology network, 2) cloud network, and/or 3) email network, that exists in the organization's environment.

4. The apparatus of claim 1, where the monitoring component is configured to utilize the existing set of artificial intelligence models trained on the normal pattern of life of the entities in the organization's environment and its associated machine learning by making a snapshot of a state of an existing cyber security appliance that is a mirror copy of the cyber security appliance protecting the organization's environment.

5. The apparatus of claim 1, where the monitoring component is configured to utilize the existing set of artificial intelligence models trained on the normal pattern of life of the entities in the organization's environment and its associated machine learning by establishing a secure communications channel with an actual cyber security appliance that is operating in real time to protect the organization's environment, but is made aware, such as by markers or other indicators that information being sent via the secure communications channel is coming from the wargaming cyber-attack exercise in the sandbox environment in the cloud environment.

6. The apparatus of claim 1, wherein i) a cyber security appliance protecting the organization's environment, ii) a separate recording component, or iii) a combination of both, is configured to record parameters, messages, model breaches, and other results of the wargaming cyber-attack exercise for later review as a wargaming cyber-attack exercise session that can reviewed in a future.

7. The apparatus of claim 1, where the user interface component is further configured to output specific aspects of the results of the wargaming cyber-attack exercise in a form of a printable report.

8. The apparatus of claim 1, where the user interface component cooperating with the attack engine is further configured to present controls and menu options to allow individual human cyber security professionals to interact with the cyber threat deployed by the attack engine during the cyber-attack on the mimic network in the cloud environment, as it happens in real time, during the wargaming cyber-attack exercise whether i) to attempt to mitigate the cyber-attack by the cyber threat and the exploit it is using from progressing in real time, and ii) conversely, to interact with the cyber threat during the cyber-attack on the mimic network in such a way to make progress on goals of the cyber-attack by augmenting and/or overriding scripted actions of the cyber threat during the cyber-attack on the mimic network.

9. The apparatus of claim 1, where the attack engine is further configured to utilize automatic attack construction for the cyber threat, which can incorporate i) an importation of an output of attack path modeling from a prevent cyber-attack simulator, ii) an awareness of Attack Surface Monitoring, and iii) any combination of both, to try and establish when a customer is vulnerable to a certain exploit used by the cyber threat in the cyber-attack on the mimic network.

10. The apparatus of claim 1, where the attack engine is further configured to record events and data in a log of attack data of how the cyber-attack is progressing on the mimic network, what components in the mimic network are being affected by the cyber threat, effects of any counter measures used by a human cybersecurity team and any automated responses by an autonomous response module in a cyber security appliance on the cyber threat that was deployed, and then the attack engine is configured to send out the log to the user interface component so that the human cybersecurity team can observe how the cyber-attack on the mimic network is playing out.

11. A method of a wargaming cyber-attack exercise, comprising:
providing an automated sandbox generator for the wargaming cyber-attack exercise on a mimic network in a cloud environment,
providing a cloud deployment component to provide an automated solution to deploy the mimic network, which consists of a portion of 1) an information technology network, 2) a cloud network, 3) an email network, or 4) a combination of all three, in a sandbox environment in the cloud environment, where the mimic network is i) a clone of some subset of components from 1) the information technology network, 2) the cloud network, 3) the email network, or 4) the combination of all three, that exists in an organization's environment, ii) a subset of predefined example components found in network architectures, or iii) some combination of both,
providing the cloud deployment component to utilize a sandbox creator to create the sandbox environment in the cloud environment,
providing an attack engine to deploy a cyber threat to use an exploit that can be tested and interacted with during the wargaming cyber-attack exercise in the mimic network deployed by the cloud deployment component,
providing a monitoring component to communicate with a series of sensors deployed in the mimic network in the sandbox environment in the cloud environment,
providing a user interface component to communicate with the monitoring component to display results of testing in the wargaming cyber-attack exercise be displayed in the user interface component,
providing the monitoring component to utilize an existing set of artificial intelligence models trained on a normal pattern of life of entities in the organization's environment and its associated machine learning, and
providing the user interface component to display, in real time, results of the wargaming cyber-attack exercise being conducted in the sandbox environment, to create a behavioral profile of how the cyber threat using the exploit would actually perform in that particular organization's environment.

12. The method of claim 11, further comprising:
providing the attack engine to interacted with the deployed cyber threat via being capable of remote control over actions taken by the cyber threat, during the wargaming cyber-attack exercise in the mimic network deployed by the cloud deployment component.

13. The method of claim 11, further comprising:
providing the user interface component to mimic at least an appearance and functionality of a user interface of a cyber security appliance protecting the 1) information technology network, 2) cloud network, and/or 3) email network, that exists in the organization's environment.

14. The method of claim 11, further comprising:
providing the monitoring component to utilize the existing set of artificial intelligence models trained on the normal pattern of life of the entities in the organization's environment and its associated machine learning by making a snapshot of a state of an existing cyber security appliance that is a mirror copy of the cyber security appliance protecting the organization's environment.

15. The method of claim 11, further comprising:
providing the monitoring component to utilize the existing set of artificial intelligence models trained on the normal pattern of life of the entities in the organization's environment and its associated machine learning by establishing a secure communications channel with an actual cyber security appliance that is operating in real time to protect the organization's environment, but is made aware, such as by markers or other indicators that information being sent via the secure communications channel is coming from the wargaming cyber-attack exercise in the sandbox environment in the cloud environment.

16. The method of claim 11, further comprising:

providing i) a cyber security appliance to protect the organization's environment, ii) a separate recording component, or iii) a combination of both, to record parameters, messages, model breaches, and other results of the wargaming cyber-attack exercise for later review as a wargaming cyber-attack exercise session that can reviewed in a future.

17. The method of claim 11, further comprising:

providing the attack engine to record events and data in a log of attack data of how the cyber-attack is progressing on the mimic network, what components in the mimic network are being affected by the cyber threat, effects of any counter measures used by a human cybersecurity team and any automated responses by an autonomous response module in a cyber security appliance on the cyber threat that was deployed, and then the attack engine sends out the log to the user interface component so that the human cybersecurity team can observe how the cyber-attack on the mimic network is playing out.

18. The method of claim 11, further comprising:

providing the user interface component cooperating with the attack engine to present controls and menu options to allow individual human cyber security professionals to interact with the cyber threat deployed by the attack engine during the cyber-attack on the mimic network in the cloud environment, as it happens in real time, during the wargaming cyber-attack exercise whether i) to attempt to mitigate the cyber-attack by the cyber threat and the exploit it is using from progressing in real time, and ii) conversely, to interact with the cyber threat during the cyber-attack on the mimic network in such a way to make progress on goals of the cyber-attack by augmenting and/or overriding scripted actions of the cyber threat during the cyber-attack on the mimic network.

19. The method of claim 11, further comprising:

providing the attack engine to utilize automatic attack construction for the cyber threat, which can incorporate i) an importation of an output of attack path modeling from a prevent cyber-attack simulator, ii) an awareness of Attack Surface Monitoring, and iii) any combination of both, to try and establish when a customer is vulnerable to a certain exploit used by the cyber threat in the cyber-attack on the mimic network.

20. A non-transitory computer readable medium in an apparatus, comprising: one or more computer readable codes operable stored in an executable state, when executed by one or more processors, to instruct the automated sandbox generator for the wargaming cyber-attack exercise on the mimic network to perform the method of claim 11.

* * * * *